United States Patent [19]

Uno

[11] Patent Number: 5,488,415
[45] Date of Patent: Jan. 30, 1996

[54] SOLID-STATE IMAGE PICKUP DEVICE HAVING A PHOTOELECTRIC CONVERSION DETECTION CELL WITH HIGH SENSITIVITY

[75] Inventor: Masayuki Uno, Ina, Japan

[73] Assignee: Olympus Optical Co., Ltd., Tokyo, Japan

[21] Appl. No.: 260,345

[22] Filed: Jun. 15, 1994

[30] Foreign Application Priority Data

Jul. 9, 1993 [JP] Japan .................................. 5-193009
Dec. 28, 1993 [JP] Japan .................................. 5-349012

[51] Int. Cl.$^6$ .................................................. H04N 3/14
[52] U.S. Cl. ........................... 348/241; 348/294; 348/300
[58] Field of Search .................................. 348/294, 300, 348/301, 302, 307, 308, 241

[56] References Cited

U.S. PATENT DOCUMENTS

| | | | |
|---|---|---|---|
| 4,994,877 | 2/1991 | Ino et al. | 348/294 X |
| 5,331,421 | 7/1994 | Ohzu et al. | 348/294 X |
| 5,335,008 | 8/1994 | Hamasaki | 348/301 |
| 5,382,977 | 1/1995 | Kozlowski | 348/300 |

*Primary Examiner*—Wendy R. Greening
*Attorney, Agent, or Firm*—Armstrong, Westerman, Hattori, McLeland & Naughton

[57] ABSTRACT

A photoelectric conversion detection cell includes a photodiode; a storage capacitor for storing a photo-induced charge induced in the photodiode; and a transfer transistor for transferring the photo-induced charge induced in the photodiode to the storage capacitor, the source of the transfer transistor being connected to the photodiode, the drain of the transfer transistor being connected to the storage capacitor; an inverting amplifier, the input of the inverting amplifier being connected to the photodiode, the output of the inverting amplifier being connected to the gate of the transfer transistor. Also, the photo-induced charge stored in the storage capacitor may be reset and an amplified output corresponding to the photo-induced charge stored in the storage capacitor may be generated by an amplifier. The photoelectric conversion detection cell is used as a pixel to form a low noise and high sensitivity solid state image pickup device. In a further embodiment, a current mirror is connected in parallel to the storage capacitor.

11 Claims, 21 Drawing Sheets

1101; DETECTION CELL

1122; OBJECT TO BE SHOT
1124; LIGHT RECEIVING DEVICE
1120; LIGHT SOURCE

SOLID-STATE IMAGE PICKUP DEVICE HAVING A PHOTOELECTRIC CONVERSION DETECTION CELL WITH HIGH SENSITIVITY

BACKGROUND OF THE INVENTION

1. Field of the Invention

The present invention relates to a solid-state image pickup device. More specifically, the present invention relates to an amplifying-type solid-state image pickup device which provides high sensitivity by preventing a reduction in sensitivity due to the influence of junction capacitance of a photodiode and which exhibits low noise performance. The present invention also related to a solid-state image pickup device which can perform high accuracy cancellation of background light so as to provide an output signal associated with light projected from a light source.

2. Description of the Related Art

Various types of solid-state image pickup devices are known. These include amplifying-type solid-state image pickup devices such as an AMI, SIT, CMD, BASIS, FGA, BCMD, as well as those of MOS and CCD types. The amplifying-type solid-state image pickup devices can be used without any problems for applications of small-sized pixels. However, problems which will be described below occur for applications such as a sensor for use in autofocus control (AF) of a camera in which rather large pixels are required.

Taking AMI (Amplified MOS Imager) as an example, the problems will be described. FIG. 1 is a circuit diagram illustrating a common configuration of one pixel of an AMI, comprising a photodiode 1001, an amplifying transistor Q1, bias transistors Q2 and Q3, a transistor Q4 for a reset operation, a bias circuit 1002, and a switching transistor 1003 which is driven by an output pulse of a shift register. In the AMI configured in this manner, an output signal voltage $\Delta V_{OUT}$ obtained as a result of photoelectric conversion is given by $$\Delta V_{OUT} = I_p \cdot t / C_d \qquad (1)$$

where $I_p$ is photocurrent, t is integral time, and $C_d$ is junction capacitance of the photodiode 1001.

As can be seen from equation 1, to obtain a greater output signal voltage $\Delta V_{OUT}$ while maintaining the integration period constant, it is required either to increase $I_p$ or to reduce $C_d$. However, the increase in $I_p$ requires an increase in the area of a pixel, which will result in an increase in $C_d$. On the other hand, the reduction in $C_d$ requires a reduction in the area of a pixel, which will result in a reduction in $I_p$. Therefore, it is impossible to increase the sensitivity of an AMI as long as the conventional configuration is employed.

One technique to solve the above-described problem is to employ a configuration disclosed in "A New MOS Imager Using Photodiode as Current Source" (IEEE Journal of Solid-State Circuits, Vol. 26, No. 8, Aug., 1991). In this configuration, transfer gate transistors Q5 and Q5 are added, and furthermore a storage capacitor $C_t$ is connected between the photodiode 1001 and the amplifying transistor Q1. In a solid-state image pickup device having such a pixel configuration, the transistor Q5 is turned on in response to a DATA signal so that the transistor Q5 operates in its saturation region during an integration period, thereby maintaining the voltage across the photodiode 1001 at a fixed value which is smaller by an amount equal to the gate-to-source voltage $V_{GS}$ than the gate voltage of the transistor Q5. As a result, photo-induced charges generated in the photodiode 1001 is stored via the transistor Q5 into the storage capacitor $C_t$ connected to the gate of the amplifying transistor Q1. In the above process, the influence of the junction capacitance $C_d$ of the photodiode 1001 is isolated, and thus the output signal voltage $\Delta V_{OUT}$ associated with the photoelectric conversion is given by $$\Delta V_{OUT} = I_p \cdot t / C_t \qquad (2)$$

As can be seen from equation 2, if the capacitance of the storage capacitor $C_t$ is reduced, then the output signal voltage $\Delta V_{OUT}$ increases. This means that the sensitivity can be determined independently of the junction capacitance $C_d$ of the photodiode.

However, the solid-state image pickup device having the above-described configuration has a disadvantage which will be described below. If the amount of incident light is constant during the integration period, no problem occurs because the current (photo current $I_p$) flowing through the transistor Q5 is constant. However, if the amount of the incident light changes during the integration period, the current flowing through the transistor Q5 also changes, which results in a change in $V_{GS}$ of the transistor Q5. As a result, charge transfer occurs between the junction capacitance $C_d$ of the photodiode and the storage capacitor $C_t$, which gives rise to a problem that an accurate output cannot be obtained in the photoelectric conversion.

To solve the above problem, the inventor of the present invention has proposed a solid-state image pickup device having a pixel configuration shown in FIG. 3, which has been disclosed in Japanese Patent Application No. 4-36922 (1992). In FIG. 3, reference numeral 1011 denotes a photodiode, and reference numeral 1012 denotes an n-type MOS transistor wherein the source of the MOS transistor 1012 is grounded and its drain is connected to a p-type MOS transistor 1013 acting as a load so that a common-source type amplifier is formed. The input of this common-source amplifier, that is the gate of the n-type MOS transistor 1012, is connected to the photodiode 1011. The output of the common-source amplifier, that is the drain of the n-type MOS transistor 1012, is connected via a capacitor 1014 to the input terminal (the gate of the n-type MOS transistor 1012) so as to provide a feedback signal. Furthermore, an n-type MOS transistor 1015 is connected in parallel to the capacitor 1014 so that the n-type MOS transistor 1015 functions as a switching transistor for resetting the gate voltage of the n-type MOS transistor 1012 to an initial potential. A solid-state image pickup device is formed with a one- or two-dimensional array of photoelectric conversion detection cells (pixels) each having the above-described configuration, wherein there is provided a n-type MOS transistor 1016 which is driven by a shift register pulse to select a pixel to be read out in such a manner that when the n-type MOS transistor 1016 is turned on, a drain voltage of the n-type MOS transistor 1012 appears on the signal output line 1017.

In the photoelectric conversion detection cell having the above configuration, photo-induced charges generated in the photodiode 1011 are stored into the capacitor 1014. Therefore, if the capacitance $C_t$ of the capacitor 1014 is reduced and the gain of the common-source amplifier is increased sufficiently, then the sensitivity increases. The bias current flowing through the n-type MOS transistor 1012 is set to a sufficiently large value compared to the photo-induced current so that the voltage across the photodiode 1011 may be maintained constant, whereby a correct photoelectric conversion output can be obtained regardless of a change in the photo-induced current.

However, the solid-state image pickup device having the configuration shown in FIG. 3 has the following problem. If the capacitance $C_t$ of the capacitor 1014 is reduced so as to obtain a higher sensitivity, the noise generated by the n-type MOS transistor 1012 is amplified by a ratio of $C_d/C_t$. As a result, the effect of the noise generated by the n-type MOS transistor 1012 becomes so large that it cannot be neglected. Therefore, something should be done to reduce the noise generated by the n-type MOS transistor 1012.

In general, noise of an MOS transistor consists of thermal noise and 1/f noise. The thermal noise is proportional to $(L/W)^{1/2}$, and the 1/f noise is inversely proportional to $L \cdot W$ where L is the channel length of the MOS transistor and W is the channel width. Therefore, if the channel length L is reduced to an attainable minimum length and the channel width is increased sufficiently enough, then the noise is reduced.

However, if the channel width is set to a large value, the parasitic capacitance between the gate and the drain of the n-type MOS transistor 1012 in the pixel configuration shown in FIG. 3 becomes large, which gives rise to an effect equivalent to an increase in capacitance $C_t$ of the capacitor 1014, which thus results in a reduction in the sensitivity.

SUMMARY OF THE INVENTION

It is an object of the present invention to solve the above-described problems relating to conventional or previously-proposed solid-state image pickup devices. More specifically, it is an object of the present invention to provide a solid-state image pickup device comprising a photoelectric conversion detection cell in which noise of an amplifying MOS transistor forming a pixel is reduced without a reduction of sensitivity.

To solve the above problems, according to one aspect of the present invention, there is provided a solid-state image pickup device comprising a photoelectric conversion detection cell, wherein the photoelectric conversion detection cell comprises: a photodiode; a storage capacitor for storing a photo-induced charge induced in the photodiode; a transfer transistor for transferring the photo-induced charge induced in the photodiode to the storage capacitor, the source of the transfer transistor being connected to the photodiode, the drain of the transfer transistor being connected to the storage capacitor; an inverting amplifier, the input of the inverting amplifier being connected to the photodiode, the output of the inverting amplifier being connected to the gate of the transfer transistor; means for resetting the photo-induced charge stored in the storage capacitor; and signal amplification means for generating an amplified output corresponding to the photo-induced charge stored in the storage capacitor.

In the solid-state image pickup device configured in the above-described manner, photo-induced charges are not stored in the photodiode but in the charge-storage capacitor. Therefore, it is possible to obtain high sensitivity by reducing the capacitance of the charge-storage capacitor. Noise comes mainly from the inverting amplifier whose input is connected to the photodiode. However, since the inverting amplifier is isolated from the storage capacitor by the transfer transistor, it is possible to design with high flexibility an MOS transistor in the input stage of the inverting amplifier without necessity to consider the influence on the sensitivity. Thus, lower noise performance can be achieved.

Another object of the present invention is to provide a solid-state image pickup device which can perform high accuracy cancellation of background light so as to provide an output signal associated with light projected from a light source.

To achieve the above object, according to another aspect of the present invention, there is provided a solid-state image pickup device comprising a detection cell, wherein the detection cell comprises: a photodiode; a storage capacitor for storing a photo-induced charge induced in the photodiode; a transfer transistor, the source of the transfer transistor being connected to the photodiode, the drain of the transfer transistor being connected to the storage capacitor; an inverter, the input of the inverter being connected to the photodiode, the output of the inverter being connected to the gate of the transfer transistor; and a current memory circuit connected in parallel to the storage capacitor, the current memory circuit being capable of maintaining a current at a value corresponding to a current flowing out via the transfer transistor.

In the detection cell configured in the above-described manner for use in a solid-state image pickup device, the current memory circuit memorizes a photo-induced current due to background light so as to cancel it, whereby the capacitor may be charged up only by the photo-induced current due to the reflected light emitted by the light source. Thus, it is possible to achieve high accuracy cancellation of the background light thereby detecting only reflected projection light.

DESCRIPTION OF THE PREFERRED EMBODIMENTS

Figure 4:
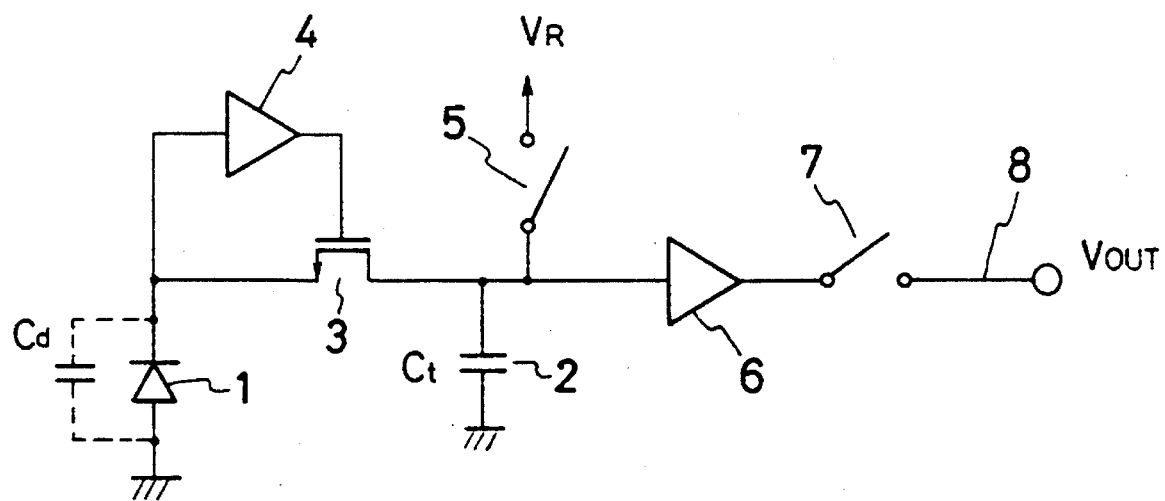
FIG. 4 is a block diagram illustrating a first basic embodiment of a photoelectric conversion detection cell for use in a solid-state image pickup device, according to the present invention.

Now, preferred embodiments according to the present invention will be described. FIG. 4 is a block diagram of a first basic embodiment of a photoelectric conversion detection cell forming a solid-state image pickup device according to the present invention. As shown in FIG. 4, the photoelectric conversion detection cell comprises a photodiode 1, a storage capacitor 2, a transfer transistor 3 for transferring photo-induced charges generated in the photodiode 1 to the storage capacitor 2, an inverting amplifier 4 for providing a feedback signal so that the photodiode 1 may be maintained at a constant potential, a reset switching device 5 for resetting the storage capacitor 2, a signal amplifier 6 for generating an amplified output corresponding to the potential of the storage capacitor 2, and a selection switching device 7 which is driven by a pulse applied from a shift register to output a signal on a signal output line 8.

In the photoelectric conversion detection cell having the above-described configuration, the inverting amplifier 4 and the transfer transistor 3 form a feedback loop, so that the cathode side of the photodiode 1 may have a low impedance whereby photo-induced charges generated in the photodiode 1 flow into the storage capacitor 2 via the transfer transistor 3. If the signal amplifier 6 has high input impedance, the photo-induced charges are stored in the storage capacitor 2. Therefore, the potential change $\Delta V_c$ of the storage capacitor 2 occurring as a result of the integration during a certain time period after the reset switching device 5 was switched from an ON state to an OFF state can be written as $$\Delta V_c = -I_p \cdot t / C_t \qquad (3)$$

where $I_p$ is the photoelectric current, $t$ is the integration time, and $C_t$ is the capacitance of the storage capacitor 2.

Figure 1:
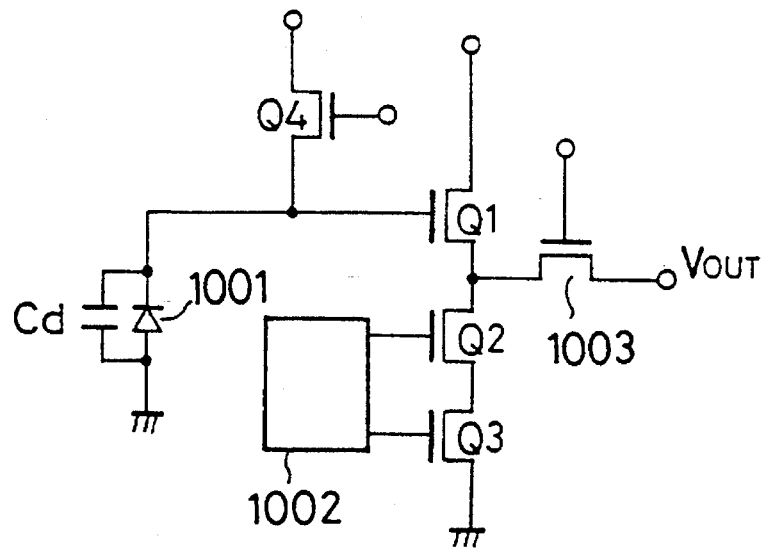
FIG. 1 is a circuit diagram illustrating a conventional pixel configuration of a solid-state image pickup device.
Figure 2:
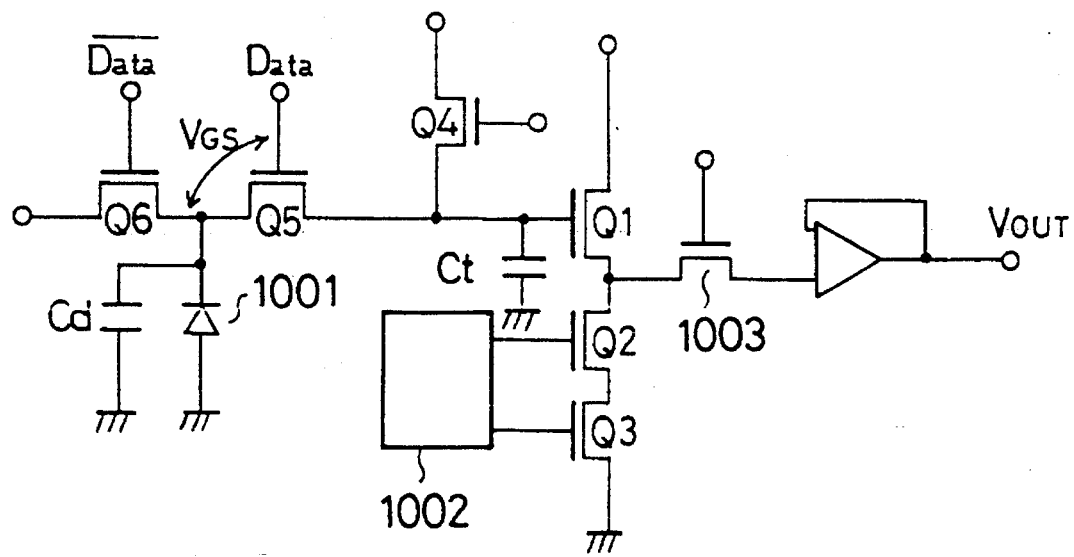
FIG. 2 is a circuit diagram illustrating another conventional pixel configuration of a solid-state image pickup device.

As can be seen from equation 3, the sensitivity can be increased by reducing the storage capacitance $C_t$. Even if the amount of the light incident on the photodiode 1 changes, feedback to the gate of the transfer transistor 3 via the inverting amplifier 4 occurs so that the potential of the source of the transfer transistor 3 may be maintained constant, whereby only the photo-induced charges corresponding to the amount of the incident light may be stored in the storage capacitor 2 without problems which occur in the conventional technique as described in connection with FIG. 2.

Figure 3:
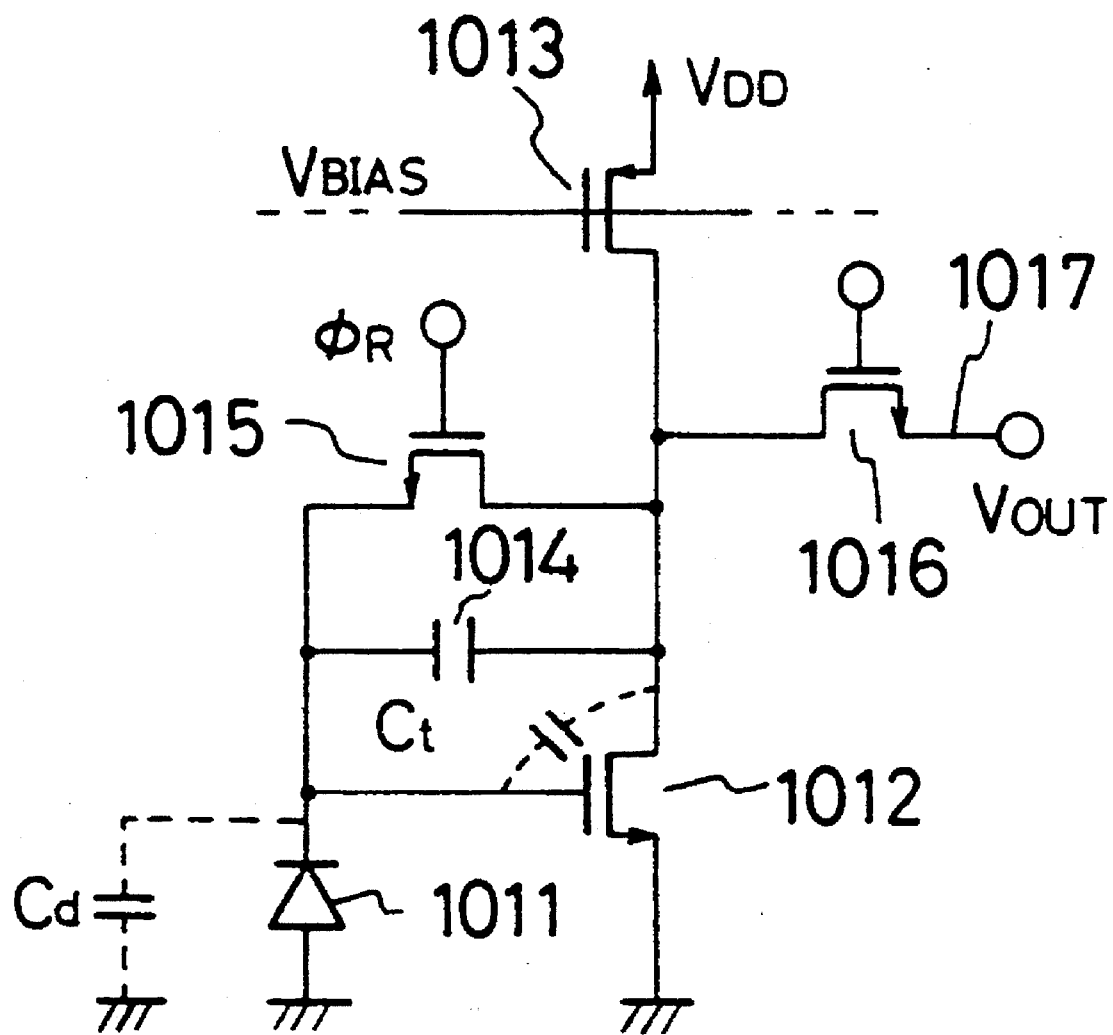
FIG. 3 is a circuit diagram illustrating a configuration of a previously-proposed photoelectric conversion detection cell for use in a solid-state image pickup device.

In the photoelectric conversion detection cell configured in the above-described manner, if noise associated with the resetting operation of the storage capacitor 2 can be neglected, then a major factor of noise is that arising in the input stage of the inverting amplifier 4, which is amplified by a ratio of $C_d/C_t \cdot A_V$ where $C_d$ is the junction capacitance of the photodiode 1, and $A_V$ is the gain of the signal amplifier 6. In the present invention, unlike the photoelectric conversion detection cell having the previously proposed configuration shown in FIG. 3, it is possible to determine the dimensions of the MOS transistor forming the input stage of the inverting amplifier 4 independently of the storage capacitor 2. As a result, it is possible to reduce the noise without a reduction in the sensitivity.

As described above, if the configuration shown in FIG. 4 is employed to form a photoelectric conversion detection cell, it is possible to achieve both high sensitivity and low noise in the solid-state image pickup device.

Figure 5:
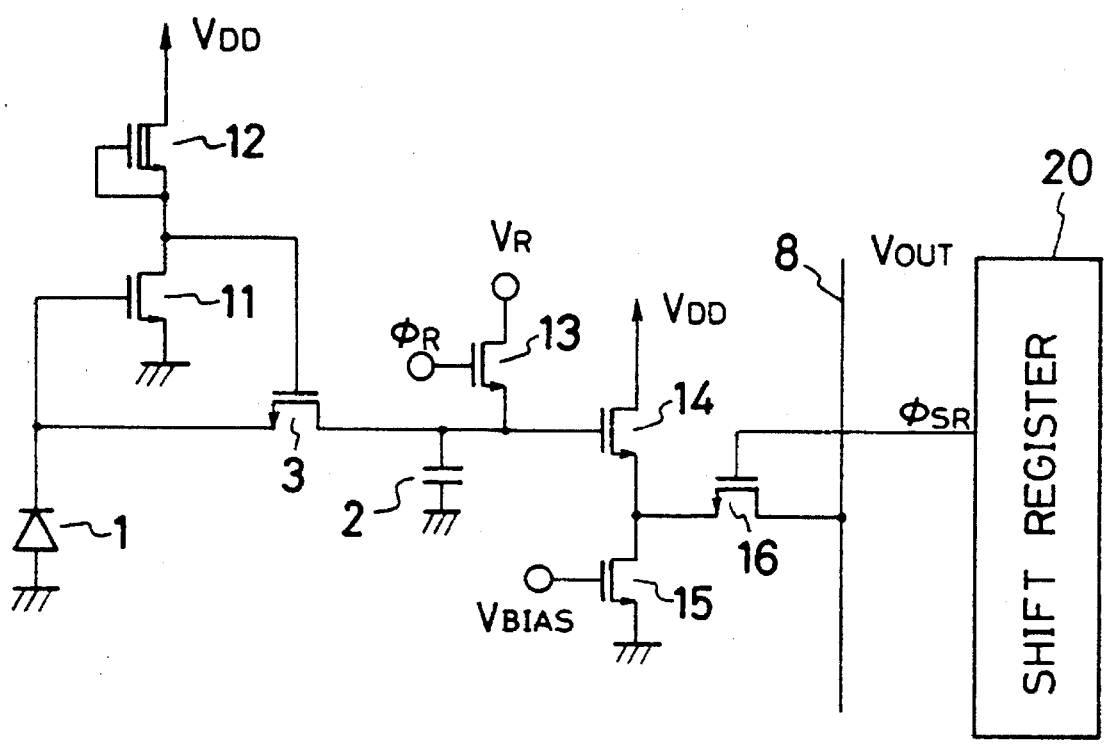
FIG. 5 is a circuit diagram illustrating a second specific embodiment of a photoelectric conversion detection cell according to the present invention.

Now, in the following second embodiment, specific examples of the inverting amplifier 4 and the signal amplifier 6 in the first embodiment shown in FIG. 4 will be disclosed. FIG. 5 is a circuit diagram of the second embodiment, wherein the circuit is made by using an n-MOS process technique. In this embodiment, the inverting amplifier 4 shown in FIG. 4 is implemented by an n-MOS inverter comprising an n-MOS transistor 11 of a common-source configuration and a depletion-type n-MOS transistor 12 acting as a load of the n-MOS transistor 11. The signal amplifier 6 shown in FIG. 4 is implemented with an n-MOS transistor 14 acting as a source follower and an n-MOS transistor 15 acting as a load of the n-MOS transistor 14 wherein the a bias voltage $V_{BIAS}$ is applied to the gate of the n-MOS transistor 15. The reset switching device 5 and the selection switching device 7 are implemented by an n-MOS transistors 13 and 16, respectively.

In the photoelectric conversion detection cell configured in the above-described manner, the reset pulse $\phi_R$ applied to the gate of the n-MOS transistor 13 for the resetting operation is switched from "H" to "L" so that the n-MOS transistor 13 for the resetting operation is switched from an ON state to an OFF state. After a certain fixed time lapse, the selection pulse $\phi_{SR}$ is provided by the shift register 20 to the n-MOS selection switching transistor 16 so that the transistor 16 is turned on, whereby a voltage $V_{OUT}$ corresponding to the integrated amount of the light is output on the signal line 8.

Figure 6:
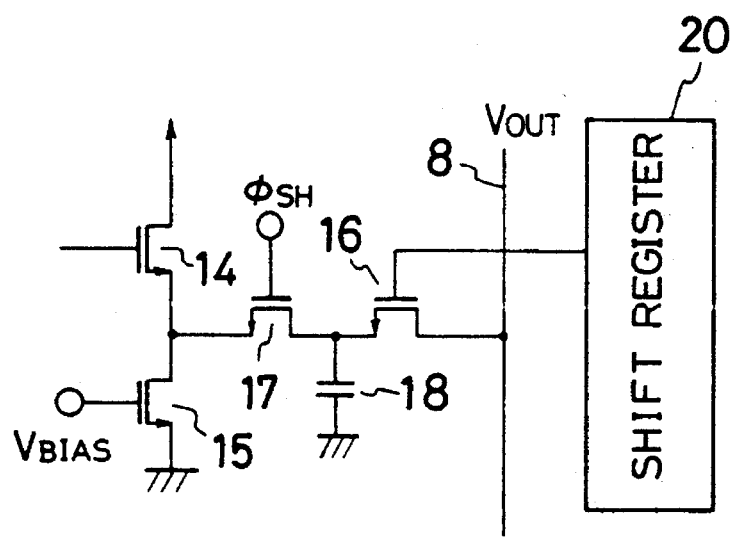
FIG. 6 is a circuit diagram illustrating major parts of a modification of the second embodiment shown in FIG. 5.

FIG. 6 is an example of a circuit configuration modified from the embodiment shown in FIG. 5. In this modified example, a sample-and-hold switching device 17 and a sample-and-hold capacitor 18 are added between the source of the n-MOS source follower transistor 14 and the source of the n-MOS selection transistor 16 so that the integration time period may be set independently of the timing of reading signals. The present embodiment has a preceding stage connected to the gate of the n-MOS source follower transistor 14, which has exactly the same configuration as that of the embodiment shown in FIG. 5, while it is not shown in FIG. 6.

Figure 7:
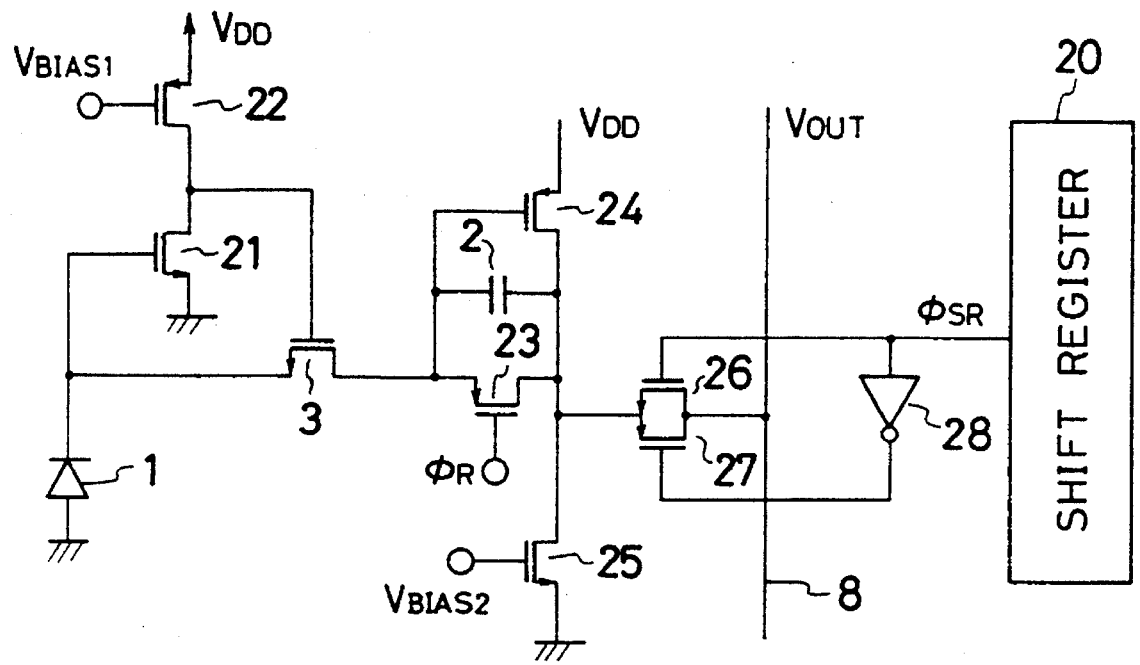
FIG. 7 is a circuit diagram illustrating a third embodiment of a photoelectric conversion detection cell according to the present invention.

Referring to FIG. 7, a third embodiment will be described below. In this embodiment, the photoelectric conversion detection cell is implemented by using a CMOS process technique. That is, the inverting amplifier 4 shown in FIG. 4 is implemented in this embodiment with a CMOS inverter comprising an n-MOS transistor 21 of a common-source configuration and a p-MOS transistor 22 whose gate is coupled to a bias voltage $V_{BIAS1}$. The signal amplifier 6 is implemented with a CMOS inverter comprising a p-MOS transistor 24 of a common-source configuration and an n-MOS transistor 25 acting as a load of the p-MOS transistor 24 wherein a bias voltage $V_{BIAS2}$ is applied to the gate of the n-MOS transistor 25. Furthermore, there are provided a storage capacitor 2 for storing photo-induced charges and a p-MOS resetting transistor 23 which are connected between the input and the output of the CMOS inverter, that is between the gate and the drain of the p-MOS transistor 24. The selection switching device is implemented with a combination of an n-MOS transistor 26 and a p-MOS transistor 27 which are connected in parallel to each other, wherein a selection pulse $\phi_{SR}$ is provided to the gate of the p-MOS transistor 27 by the shift register 20 via an inverter 28.

The photoelectric conversion detection cell having the above-described configuration operates in the same manner as that of the embodiment shown in FIG. 5. That is, the reset pulse $\phi_R$ is switched from "H" to "L" so that the p-MOS resetting transistor 23 is switched from an ON state to an OFF state. When a certain fixed time has elapsed after that, the selection pulse $\phi_{SR}$ is provided by the shift register 20 to the selection switching device comprising the n-MOS transistor 26 and the p-MOS transistor 27 so as to turn on these transistors 26 and 27, whereby a signal is output on the signal line 8.

In the second embodiment shown in FIG. 5 in which the output changes in the negative direction with an increasing integrated amount of light, In contrast, in the third embodiment shown in FIG. 7, the output changes in the positive direction with an increasing integrated amount of the light. If it is assumed that the p-MOS resetting transistor 23 has ideal switching performance, the transistor 24 comes into a linear operating region as a result of the integration associated with the photo-induced charges, which gives rise to a reduction in the dynamic range. This can be avoided if feedthrough charges of the p-MOS resetting transistor 23 are utilized. That is, if the feedthrough charges, which are induced when the p-MOS resetting transistor 23 is switched from an ON state to an OFF state, move into the storage capacitor 2, then the bias point of the drain voltage of the p-MOS transistor 24 is shifted in the negative direction immediately after the resetting operation has been done so that the p-MOS transistor 24 may operate in the saturation region. Therefore, if the dimensions of the p-MOS resetting transistor 23 are designed properly, the p-MOS transistor 24 may have a wide operating region.

Figure 8:
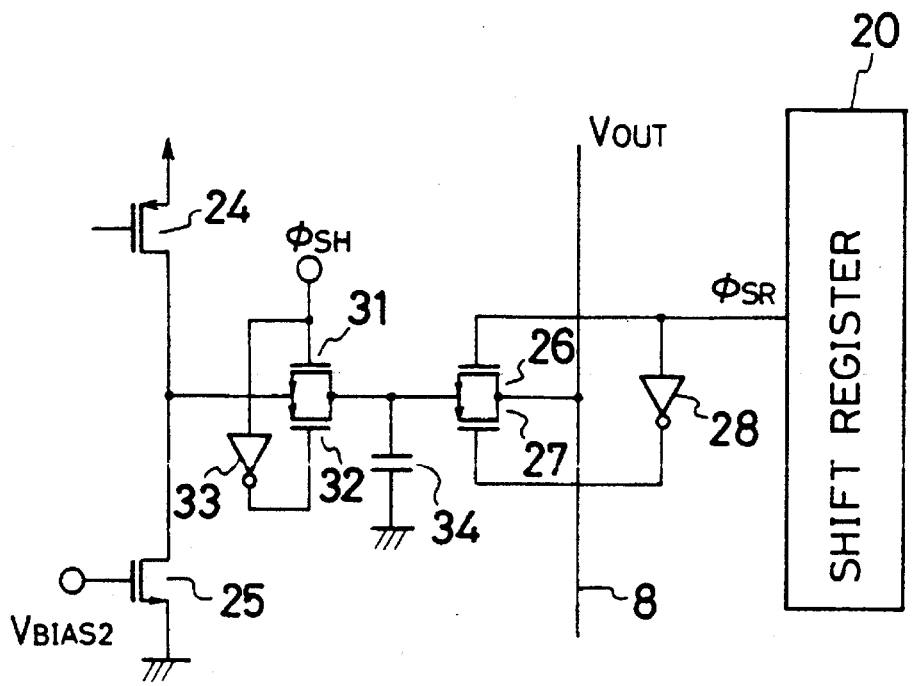
FIG. 8 is a circuit diagram illustrating major parts of a modification of the third embodiment shown in FIG. 7.

As the embodiment shown in FIG. 6 may be obtained by modifying the second embodiment shown in FIG. 5, the third embodiment shown in FIG. 7 may also be modified by adding a sample-and-hold switching devices 31, 32 and a sample-and-hold capacitor 34 as shown in FIG. 8 so that the integration time period may be set independently of the timing of the signal reading. In FIG. 8, there is shown an inverter 33 for applying an inverted sample-and-hold pulse $\phi_{SH}$ to the switching device 32. The present embodiment has a preceding stage connected to the p-MOS source follower transistor 24, which has exactly the same configuration as that of the third embodiment shown in FIG. 7, while it is not shown in FIG. 8.

In the above two embodiments, there are shown specific implementations of the inverting amplifier 4 and the signal amplifier 6 of the first basic embodiment shown in FIG. 4. However, it is also possible to employ an arbitrary combination of the inverting amplifier and the signal amplifier shown in the above embodiments. Furthermore, in the case where the cathode side of the photodiode is grounded through the substrate or the well, an equivalent photoelectric conversion detection cell may be realized by replacing each MOS transistor of each embodiment shown in FIG. 5 or 7 with an MOS transistor having an opposite polarity.

In connection with the second and third embodiments shown in FIG. 5 or 7, the bias voltage applied to the photodiode will be described below. In the embodiments shown in FIGS. 5 and 7, the bias voltage applied to the photodiode 1 is determined by the source-to-gate voltage $V_{GS}$ of the n-MOS transistor 11 or 21. $V_{GS}$ depends on the threshold voltage $V_{TH}$ of the n-MOS transistor 11 or 21 as well as its bias current. The bias current should be set such that it is sufficiently large compared to the photo-induced current and at the same time should be small enough to suppress the consumption current. Therefore, the bias current is limited in a rather narrow range. On the other hand, $V_{TH}$ depends on the process technique used. In a common CMOS or n-MOS process technique, $V_{TH}$ is selected to have a value of about 1 V. If a common n-MOS transistor is used, therefore, a reverse bias voltage of about 1 V is applied to the photodiode during the integration period.

If a large bias voltage is applied to the photodiode, dark charges, which are generated in the photodiode under the condition where there is no light illuminated to the photodiode, become great, which results in generation of noise. This effect can be suppressed by reducing $V_{TH}$ of the n-MOS transistor 11 or 21, which may be achieved by doping the channel of the n-MOS transistor 11 or 21 with impurities. Thus, a great reduction in the dark current may be achieved by employing an n-MOS transistor having a $V_{TH}$ of about 0.1 V.

As described in connection with the above embodiments, the sensitivity may be increased by reducing the capacitance $C_t$ of the storage capacitor 2, and the noise voltage may be reduced by increasing the width of the n-MOS transistor 11 or 21 forming the inverting amplifier. In this way, it is possible to achieve a solid-state image pickup device which provides both high sensitivity and low noise.

With each embodiment described above, it is possible to reduce the noise generated by the inverting amplifier to which the photodiode is connected. However, when the capacitance $C_t$ of the storage capacitor 2 is reduced so as to increase the sensitivity, the resetting noise arising from the resetting operation of the storage capacitor 2 becomes great.

According to a fourth embodiment which will be described below, the resetting noise may be suppressed. The resetting noise may be removed if each embodiment described above is modified such that the output signal is provided as the difference between the voltage after the completion of the signal integration and the voltage in a reset state at a time immediately after the resetting switching device or the n-MOS resetting transistor has been changed from an ON state to an OFF state.

Figure 9:
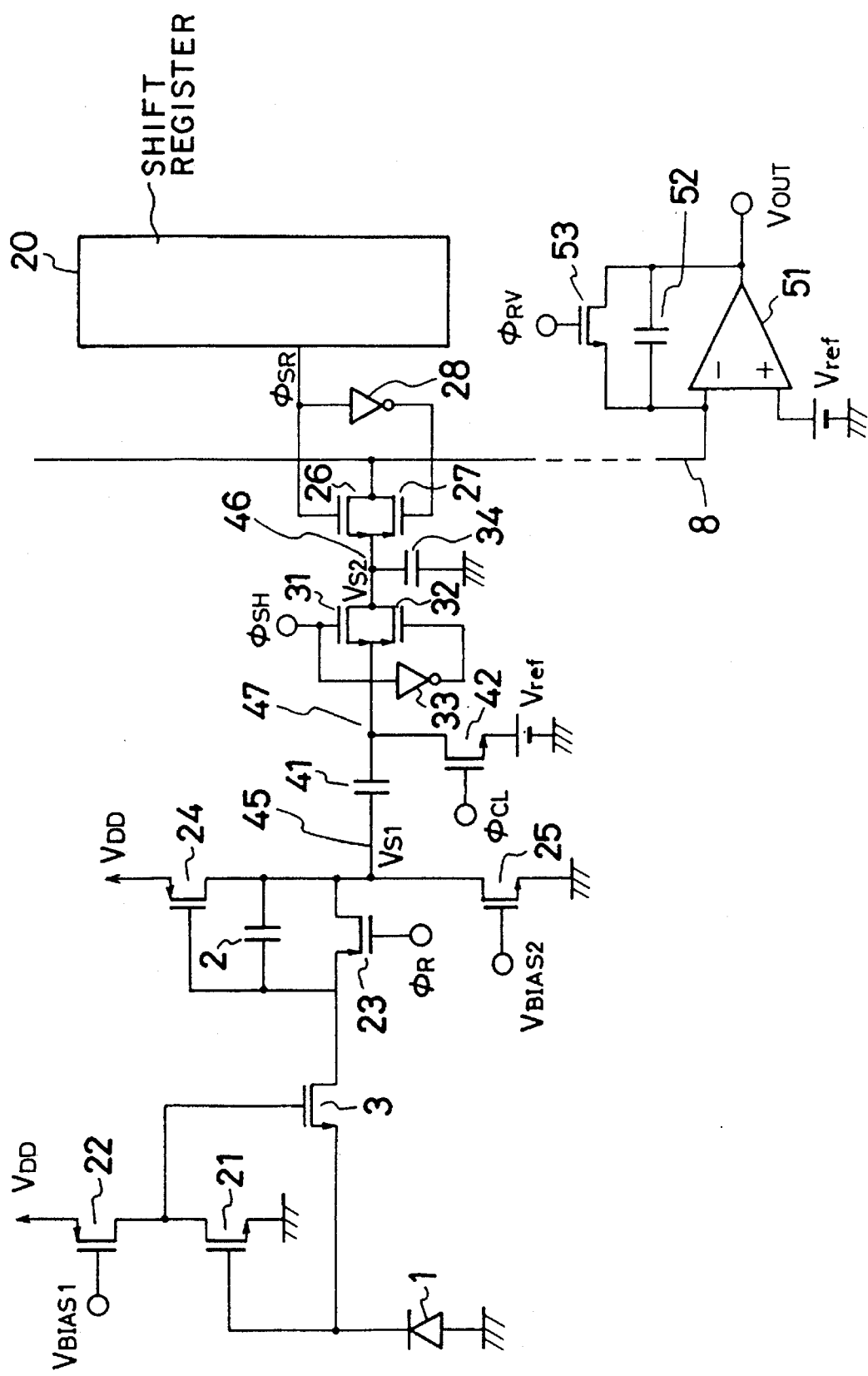
FIG. 9 is a circuit diagram illustrating a fourth embodiment of a photoelectric conversion detection cell according to the present invention.

FIG. 9 illustrates a circuit configuration of the fourth embodiment. This fourth embodiment shown in FIG. 9 can be obtained by adding some components which will be described below to the embodiment shown in FIG. 8 which is a modification extracted by adding a sample-and-hold circuit to the third embodiment shown in FIG. 7. That is, a capacitor 41 is connected in series between the sample-and-hold switching devices 31, 32 and the connecting point (node 45) through which the output of the signal amplifier or the drain of the p-MOS transistor 24 is connected to the drain of the n-MOS transistor 25. Furthermore, an n-MOS transistor 42 is connected to the connecting point (node 47) through which the capacitor 41 is connected to the sample-and-hold switching devices 31, 32. The source of the n-MOS transistor 42 is connected to a reference voltage source $V_{ref}$, and a clamping pulse $\phi_{CL}$ is applied to the n-MOS transistor 42 so that the n-MOS transistor 42 may operate as a switching device for the clamping operation.

In the photoelectric conversion detection cell configured in the above-described manner, the output voltage at the node 45 is clamped immediately after the p-MOS resetting transistor 23 has been turned off from an ON state so that the difference signal component at the node 45 may be output, thereby removing the resetting noise which arises when the capacitor 2 is reset by the p-MOS resetting transistor 23. Resetting noise also occurs as a result of the switching operation for the clamping or sample-and-hold. However, this resetting noise may be reduced to a low level acceptable in practical use by employing large capacitance for the clamping capacitor 41 and the sample-and-hold capacitor 34.

Figure 10:
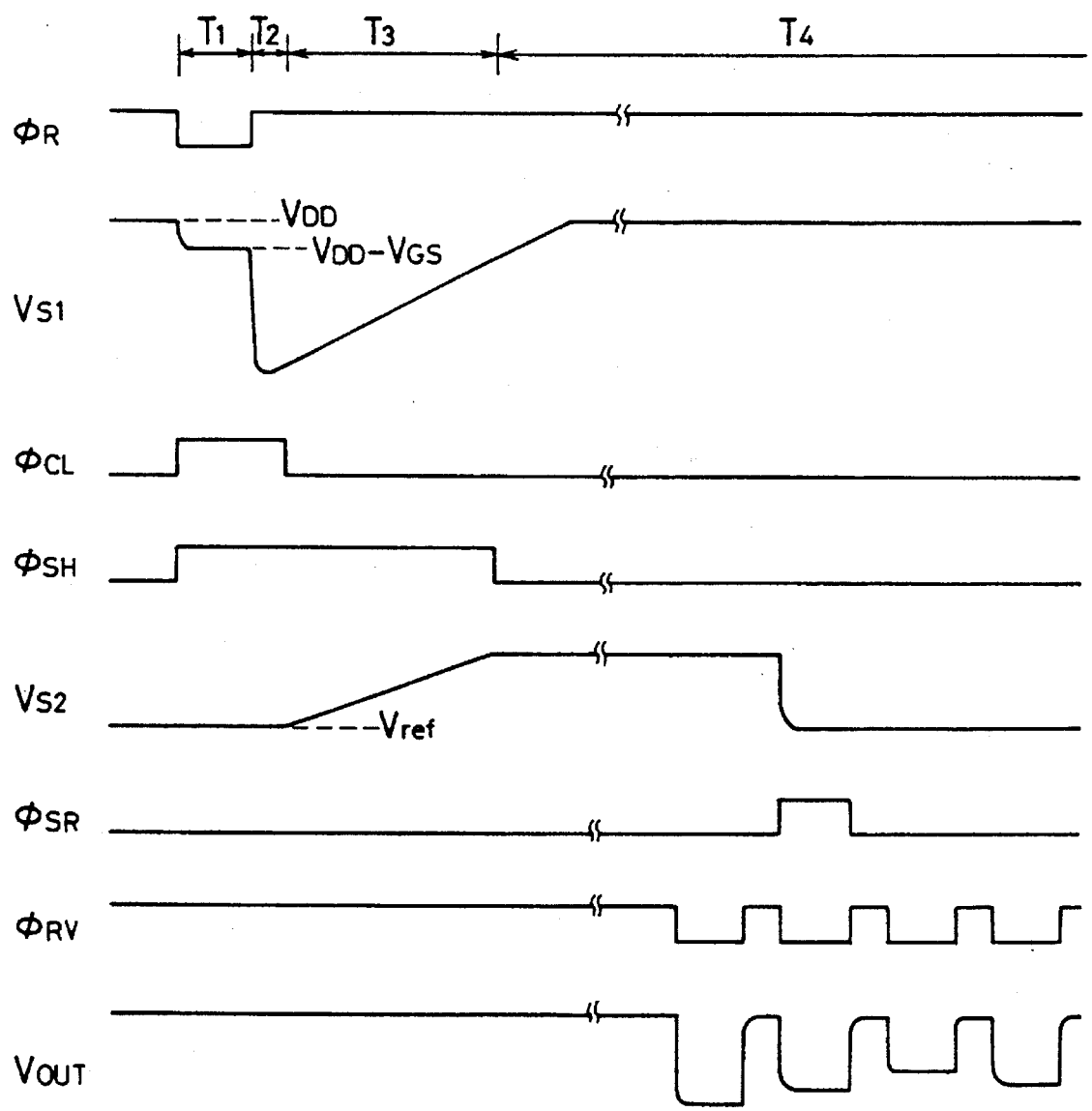
FIG. 10 is a timing chart illustrating the operation of a line sensor constructed with photoelectric conversion detection cells according to the fourth embodiment shown in FIG. 9.

FIG 10 is a timing chart of a line sensor made by using photoelectric conversion detection cells (pixels) according to the fourth embodiment shown in FIG. 9. The line sensor is configured such that the resetting pulse $\phi_R$, the clamping pulse $\phi_{CL}$, and the sample-and-hold pulse $\phi_{SH}$ are provided in common to all pixels, and the selection pulse $\phi_{SR}$ is provided by the shift register 20 so as to sequentially select each pixel.

In FIG. 10, charges stored in the capacitor 2 are reset during a time period $T_1$. The resetting operation of the capacitor 2 is accomplished by applying a resetting pulse $\phi_R$ having an "L" level to the p-MOS resetting transistor 23 so that the p-MOS resetting transistor is turned on. Then, the p-MOS resetting transistor 23 is turned off from the ON state in a manner as will be described below. If the voltage of the node 43 is represented by $V_{S1}$, $V_{S1}$ drops by an amount corresponding to feedthrough charges induced when the p-MOS resetting transistor 23 is turned off from the ON state. Then, $V_{S1}$ increases according to the charges stored in the capacitor 2. Therefore, if the clamping pulse $\phi_{CL}$ is changed from "H" to "L" when the voltage drop due to the feedthrough charges has settled (at the end of the time period $T_2$), then it is possible to obtain an output signal containing no noise due to the feedthrough charges of the p-MOS resetting transistor 23 and the resetting noise charges.

In the integrating operation during a time period $T_3$ after that, the voltage $V_{S2}$ across the sample-and-hold capacitor 34 (the potential at node 46) increases corresponding to the amount of light. After a predetermined fixed time has elapsed, a sample-and-hold pulse $\phi_{SH}$ is applied to the sample-and-hold switching devices 31 and 32 so that these switching devices 31 and 32 are turned off from an ON state, whereby the potential at that time is held in the sample-and-hold capacitor 34. During a time period $T_4$ after that, the shift register 20 is scanned and the signal charges held in the sample-and-hold capacitors 34 are read out.

The reading out operation associated with the signal charges stored in the sample-and-hold capacitor 34 is performed as follows. Various known techniques are available to read the signal charges. One technique is to convert the current arising from the transport of the charges into a voltage by means of a resistor so as to read out the resultant voltage. Another technique is to read out the voltage change on the signal line via a buffer having a high input impedance. In the fourth embodiment shown in FIG. 9, the read out operation is accomplished by using a capacitive-feedback operational amplifier 51 wherein a feedback capacitor 52 and an n-MOS switching transistor 53 are connected between the inverting input terminal and the output terminal, and wherein the non-inverting input terminal is connected to a reference voltage source $V_{ref}$. The technique using the capacitive-feedback operational amplifier 51 has an advantage that the gain is determined by the capacitances of the sample-and-hold capacitor 34 and the feedback capacitor 52 of the operational amplifier 51 independently of the signal line capacitance.

Referring to the timing chart shown in FIG. 10, the operation of reading out the signal charges will be described below. In FIG. 9, the n-MOS transistor 53, which is driven by the pulse $\phi_{RV}$ functions as a switching device for resetting the feedback capacitor 52. When the pulse $\phi_{RV}$ is changed from "H" to "L", the feedback capacitor 52 is reset, and a voltage corresponding to the reference voltage $V_{ref}$ appears as the output voltage $V_{OUT}$. Then, in response to a selection pulse $\phi_{SR}$ provided by the shift register 20, the MOS switching transistors 26 and 27 for pixel selection are turned on so that the sample-and-hold capacitor 34 is connected to the signal line 8. Since the signal line is connected to the inverting input terminal of the operational amplifier 51 wherein the inverting input terminal is maintained at a virtual ground level so that the inverting input terminal has a low impedance, the signal charges stored in the sample-and-hold capacitor 34 are transferred to the feedback capacitor 52. As a result, the output voltage $V_{OUT}$ becomes lower by an amount corresponding to the signal charges relative to the reference voltage $V_{ref}$. This change represents the signal voltage. Subsequently, the pulse $\phi_{RV}$ is changed to "H" so that the signal charges transferred into the feedback capacitor 52 are reset. The next pixel is then selected in response to a selection pulse $\phi_{SR}$ provided by the shift register 20. The whole pixels are read out by performing the above-described procedure repeatedly.

Figure 11:
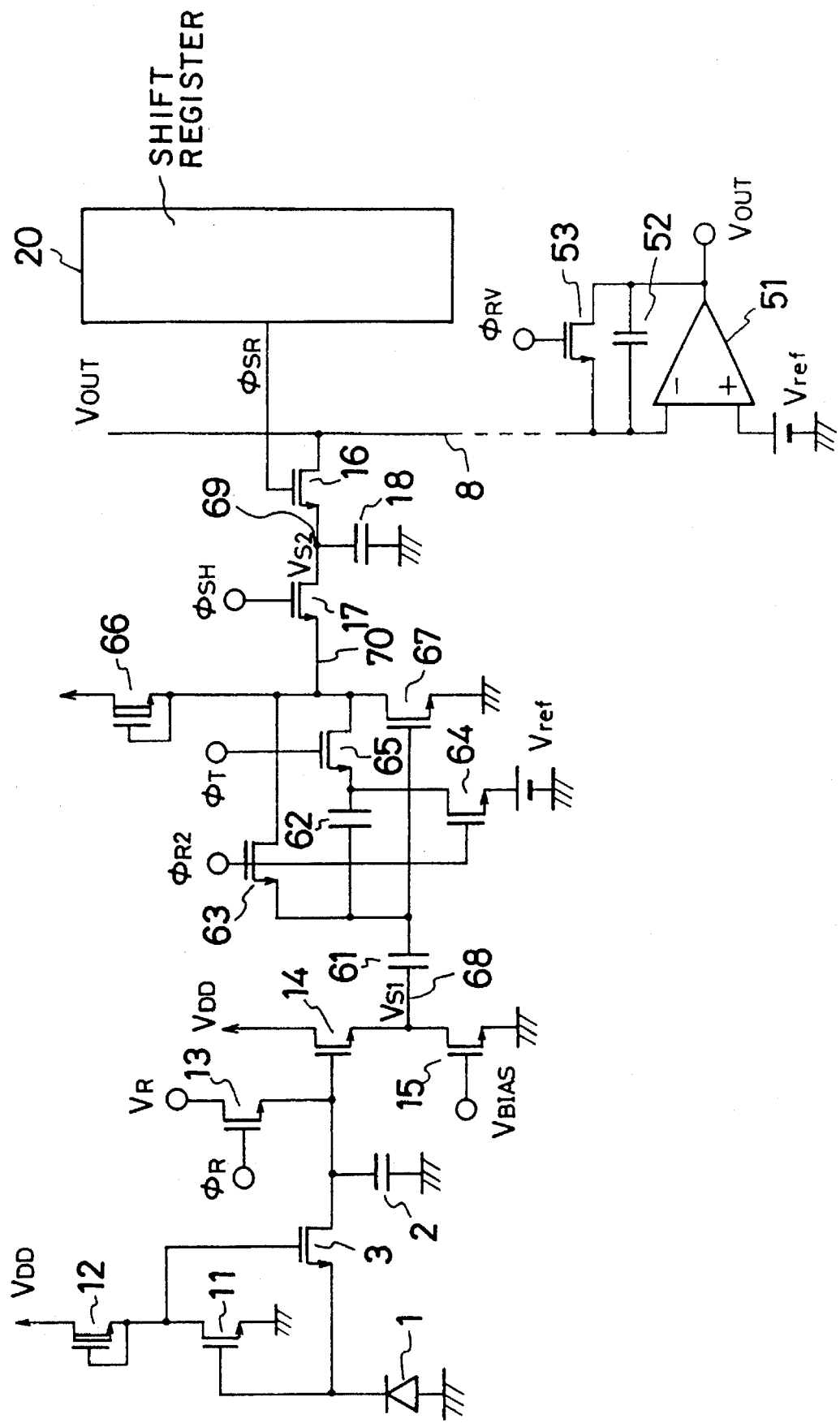
FIG. 11 is a circuit diagram illustrating a fifth embodiment of a photoelectric conversion detection cell according to the present invention.

FIG. 11 illustrates another embodiment in which the difference between the voltage after the completion of the integration operation and that after the resetting operation is employed as the output, thereby removing the resetting noise which occurs during the resetting operation of the storage capacitor 2. This fifth embodiment has a configuration which can be obtained by modifying the photoelectric conversion detection cell shown in FIG. 6 such that a capacitive-coupling inverting amplifier is added between the source (node 70) of the sample-and-hold n-MOS transistor 17 and the output terminal of the signal amplifier, that is the connecting point (node 68) at which the source of the n-MOS transistor 14 is connected to the drain of the n-MOS transistor 15.

The capacitive-coupling inverting amplifier comprises an n-MOS inverting amplifier comprising an n-MOS transistor 67 having a common source configuration and a depletion-type n-MOS transistor 66 acting as a load of the n-MOS transistor 67, a series connection of a capacitor 62 and an n-MOS switching transistor 65 disposed between the output and input of the n-MOS inverting amplifier, a capacitor 61 for receiving an input signal by means of capacitive coupling wherein the capacitor 61 is connected between the node 68 and the gate of the n-MOS transistor 67, an n-MOS resetting transistor 63 for providing initial voltages to the capacitors 61 and 62, and an n-MOS resetting transistor 64 wherein a reference voltage $V_{ref}$ is applied to the n-MOS resetting transistor 64.

Figure 12:
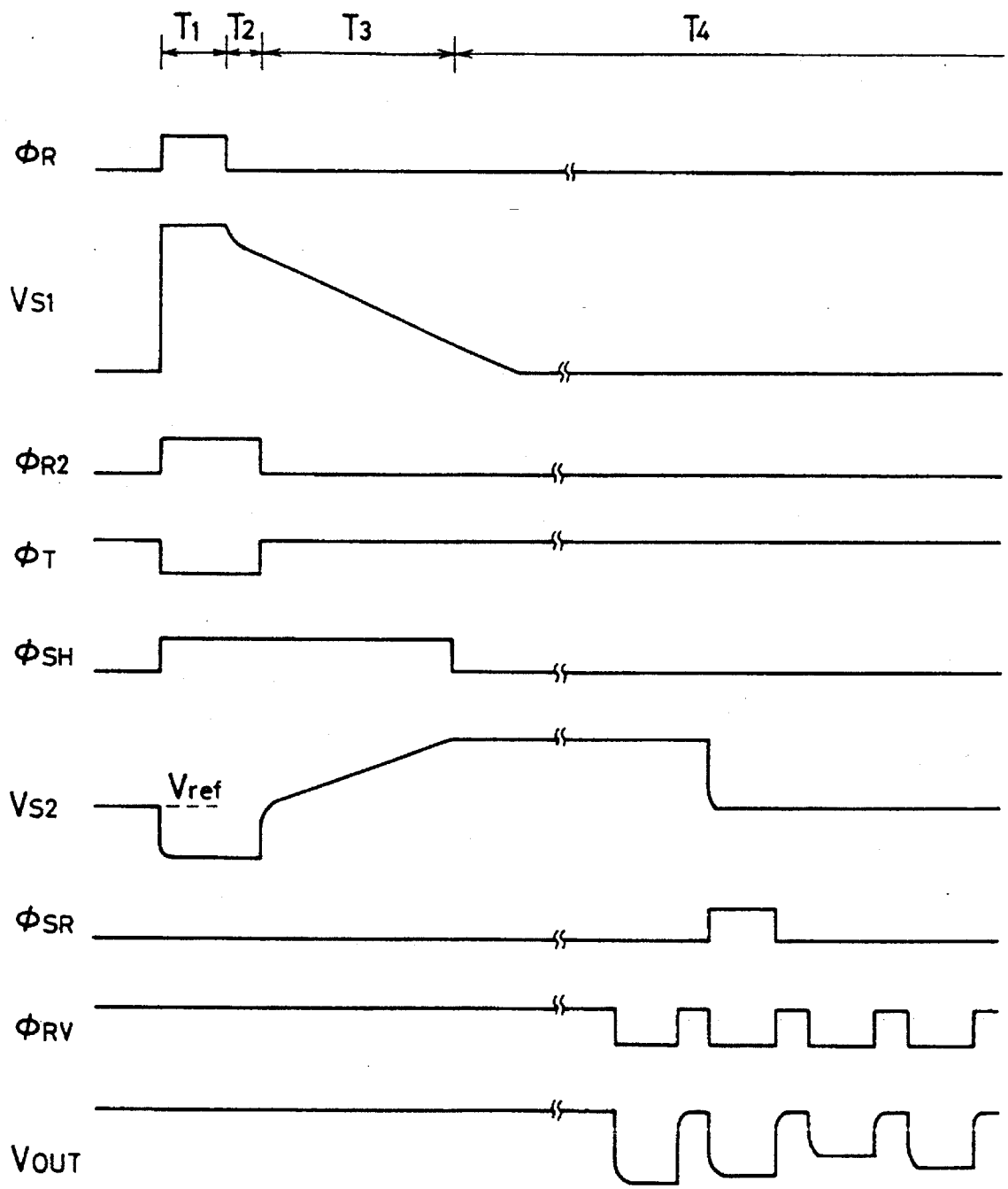
FIG. 12 is a timing chart illustrating the operation of a line sensor constructed with photoelectric conversion detection cells according to the fifth embodiment shown in FIG. 11.

Referring to the timing chart shown in FIG. 12, the operation of the photoelectric conversion detection cell configured in the above-described manner will be explained below. The storage capacitor 2 is reset during a time period $T_1$. During this time period, the resetting pulse $\phi_R$ is at "H", and the resetting pulse $\phi_{R2}$ is also at "H" so that the succeeding capacitive-coupling inverting amplifier is in a reset state. In a time period $T_2$ following $T_1$, the resetting pulse $\phi_R$ goes to "L" from "H", whereby the potential $V_{S1}$ at the node 68 drops by an amount corresponding to the feedthrough charges which are induced when the n-MOS resetting transistor 13 is changed from an ON state to an OFF state, and the potential $V_{S1}$ further decreases gradually corresponding to the photo-induced charges stored in the storage capacitor 2. Slightly later after the resetting pulse $\phi_R$ was changed from "H" to "L", the resetting pulse $\phi_{R2}$ is changed from "H" to "L" so as to avoid the influence of the feedthrough charges, and furthermore the resetting pulse $\phi_{R2}$ is changed from "H" to "L" and the transfer pulse $\phi_t$ is change from "L" to "H" so that the feedback path to the inverting amplifier may be formed. At this stage, the initial potential of node 70 is set to a level approximately equal to the reference voltage $V_{ref}$ which has been applied to one end of the capacitor 62 during the time period $T_2$.

After that, the potential $V_{S2}$ at the node 70 and node 69, to which sample-and-hold capacitor 18 is connected, rises with the falling potential at the node 68 during time period $T_3$. After a certain time period of integration with respect to the potential $V_{S2}$, sample-and-hold n-MOS transistor 17 is changed from an ON stage to OFF state so as to hold signal charges in the sample-and-hold capacitor 18. Then, the signal charges are read out sequentially during a time period $T_4$ and corresponding output voltages $V_{OUT}$ are provided. These output voltages $V_{OUT}$ are read out in the same manner as that in the fourth embodiment described in connection with FIG. 9.

In the above operation, after the changes in the potential $V_{S1}$ due to the feedthrough charges and the resetting noise charges, arising from the change of the resetting pulse $\phi_R$ from an ON state to an OFF state, have settled down, the change in the potential $V_{S1}$ is dealt with as signal charges so that the resetting noise which occurs when storage capacitor 2 is reset may be removed. Resetting noise associated with the capacitors 61, 62, and 18 also occurs. However, this resetting noise may be reduced to a low level acceptable in practical use by increasing the capacitances of capacitors 61, 62, and 18.

As described above, with the third and fourth embodiments shown in FIGS. 9 and 11, respectively, the noise associated with the n-MOS transistor at the first stage as well as the resetting noise which occurs when the storage capacitor 2 is reset can be suppressed to a sufficiently low level. Thus, it is possible to realize a solid-state image pickup device which can provide both high sensitivity and low noise.

In the solid-state image pickup devices of the above-described embodiments, photo-induced charges generated in the photodiode are stored in the capacitor for storing charges so that high sensitivity may be obtained, and the storage capacitor is isolated from the inverting amplifier by the transfer transistor so that low noise performance may be obtained.

In another embodiment of a solid-state image pickup device which will be described below, capability of removing unnecessary background light can be obtained, in addition to the performance of high sensitivity and low noise according to the above-described embodiments.

In general, autofocus (AF) techniques for a camera can be classified broadly into passive and active techniques. In the passive autofocus technique, two separate images of an object to be shot are formed via two lenses (separator lenses), and the distance to the object to be shot is determined from the space between these two separated images. In the active autofocus technique, light is projected by an LED or the like of a camera, and the distance to the object to be shot is determined from the position of the reflected light. The former technique has a disadvantage that the distance measurement accuracy is degraded if an object to be shot is dark or has a low contrast. On the other hand, the latter technique has a disadvantage that the reflection of the light emitted by the LED cannot be detected if the back ground is too bright. Thus, both techniques have advantages and disadvantages depending on an object to be shot.

Figure 13:
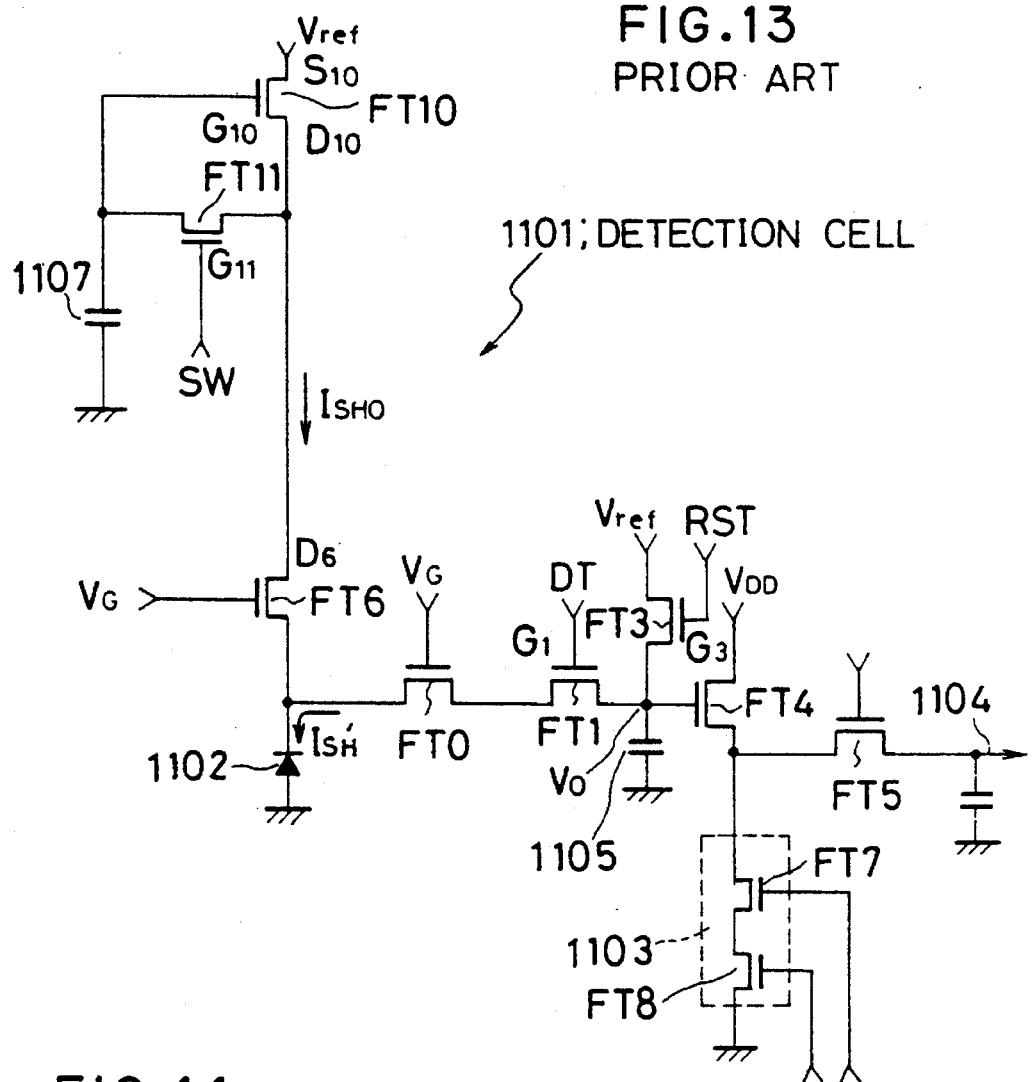
FIG. 13 is a circuit diagram illustrating a configuration of a conventional line sensor for use in active AF.
Figure 14:
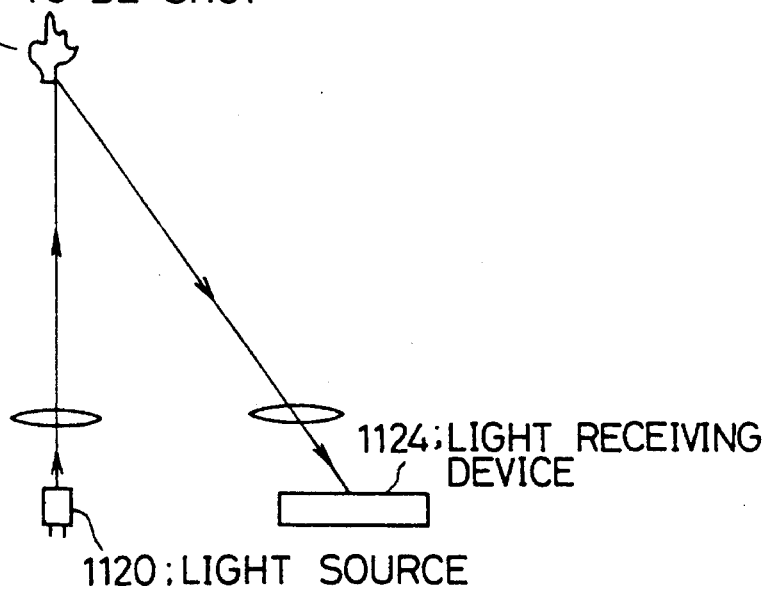
FIG. 14 is a schematic diagram illustrating a configuration of a conventional active AF module.

In view of the above problems, a line sensor employing an active autofocus sensor which can expand an autofocus range by removing the background light has been proposed in Japanese Patent Application Laid-Open No. 64-18255 (1989). FIG. 13 shows the configuration of one pixel of the line sensor disclosed in the above-described patent application, and FIG. 14 shows a technique associated with the active autofocus module. In the detection cell 1101 shown in FIG. 13, the drain $D_6$ of an MOS transistor FT6 is connected to a p-channel MOS transistor FT10. The source $S_{10}$ of the MOS transistor FT10 is maintained at a reference voltage $V_{ref}$. The gate G10 of the MOS transistor FT10 is connected to a capacitor 1107. An n-channel MOS transistor FT11 is disposed between the gate $G_{10}$ and the drain $D_{10}$ of the MOS transistor FT10. In response to a switching signal SW applied to the gate $G_{11}$, the MOS transistor FT11 connects gate $G_{10}$ and drain $D_{10}$ of the MOS transistor FT10 to each other, or isolates gate $G_{10}$ and drain $D_{10}$ from each other.

In a light receiving device shown in FIG. 14, which employs a solid-state image pickup device comprising detection cells 1101 configured in the above-described manner, the charges corresponding to a photo-induced current $I_{SHO}$ generated in a photodiode 1102 due to light other than a signal light, or background light, is stored in a capacitor 1107 before detecting the distance to an object 1122 to be shot. That is, an information storage signal DT is shut off before the distance measurement so that the photodiode 1102 may be isolated from a capacitor 1105. Furthermore, a resetting signal RST is applied to the gate $G_3$ of a switching device FT 3 so that the initial voltage $V_0$ across the capacitor 1105 is set to the reference voltage $V_{ref}$. At this stage, a light source 1120 comprising an infrared light emitting diode is not driven so that signal light is not incident on the photodiode 1102 whereby only background light is incident on the photodiode 1102. Furthermore, the switching signal SW is maintained at a high level so that the MOS transistor FT11 is in an ON state.

In this state, the MOS transistor FT10 acts as a load having a predetermined low resistance, and thus the photo-induced current $I_{SHO}$ generated in the photodiode 1102 due to the background light flows from the voltage source of the reference voltage $V_{ref}$ to the photodiode 1102 via the MOS transistor FT10 and the transistor FT6. Here, since the capacitor 1105 is isolated from the photodiode 1102, the voltage across the capacitor 1105 is maintained at the initial value equal to the reference voltage $V_{ref}$. The voltage across the capacitor 1107 has a value lower than the reference voltage $V_{ref}$ by the amount corresponding to the voltage drop due to the photo-induced current $I_{SHO}$ associated with the background light flowing through the resistance of the MOS transistor FT10 acting as a load. Thus, the capacitor 1107 stores the charges corresponding to the photo-induced current $I_{SHO}$ induced by the background light.

When the charges stored in the capacitor 1107 are saturated, the stored charges correspond to the photo-induced current $I_{SHO}$ associated with the background light. Therefore, if the switching signal SW is changed to a low level so as to turn off the MOS transistor FT11, then the charges stored in the capacitor 1107 corresponding to the photo-induced current $I_{SHO}$ associated with the background light will be maintained unchanged. This means that the photo-induced current $I_{SHO}$ associated with the background light is memorized as the voltage at the gate $G_{10}$ of the MOS transistor FT10.

In this state, now, it is possible to start storing the information associated with the signal light or the pixel information into the capacitor 1105. That is, the light source 1120 is driven so that the signal light may be incident on the photodiode 1102, and furthermore the information storage signal DT is applied to the gate $G_1$ of the switching device FT1 so that the switching device FT1 is turned on thereby making an electrical connection between the capacitor 1105 and the photodiode 1102.

The photodiode 1102 also receives the background light superimposed on the signal light. However, since the photo-induced current $I_{SHO}$ associated with the background light corresponds to the voltage memorized as the gate voltage at the gate $G_{10}$ of the MOS transistor FT10, the current flowing from the capacitor 1105 into the photodiode 1102 corresponds only to the photo-induced current $I_{SH}$, associated with the signal light. As a result, the voltage $V_0$ across the capacitor 1105 becomes lower than the initial voltage $V_{ref}$ by the amount corresponding to the photo-induced current $I_{SH}'$ associated with the signal light. This means that the reduction in the voltage $V_0$ across the capacitor 1105 corresponds only to the intensity of the signal light without influence of the background light. The voltage $V_0$ across the capacitor 1105 storing the information in the above-described manner is read out on a video line 1104 via a current amplifier or a source follower and a switching device FT5 in the manner described previously, wherein the current amplifier comprises a transistor FT4 and a constant-current source 1103.

Detection cells having the above-described configuration are arranged in a one- or two-dimensional form so as to construct a line or area sensor. The line sensor disclosed in the above patent application can be summarized in that a current memory circuit comprising the MOS transistors FT10, FT11 and the capacitor 1107 is added so that the background light may be cancelled, whereby only the photo-induced charges associated with the light projected from the light source can be stored in and read out from the capacitor 1105 without significant influence of the background light.

However, the sensor according to the prior art shown in FIG. 13 has a disadvantage described below. If gate-to-source voltage of the MOS transistor FT6 is denoted by $V_{GSO}$, and that of the MOS transistor FT0 is denoted by $V_{GSO}$, then when the information storage signal DT is at an OFF level, that is, during the operation for memorizing the background light in the capacitor 1107, the voltage $V_{PD}$ applied to the photodiode 1102 can be written as $$V_{PD}=V_G-V_{GS6}(I_{SHO}) \quad (4)$$

In this situation, since the MOS transistor FT0 is in a OFF state, $V_{PD}$ has a value corresponding to the $I_{SHO}$. If DT is then changed to an ON level, then $V_{PD}$ becomes:

$$V_{PD}=V_G-V_{GS6}(I_{SHO})$$
$$V_{PD}=V_G-V_{GSO}(I_{SH}') \quad (5)$$

In this Case, the voltage $V_{PD}$ is determined depending on both MOS transistors FT6 and FT0 having a common-gate configuration, and feedback is provided so that $V_{GS6}=V_{GSO}$. For example, in the case where the MOS transistors FT0 and FT6 have the same transistor dimensions if $I_{SHO}>I_{SH}'$, then the drain voltage of the MOS transistor FT6 increases, and the source-to-drain voltage of the MOS transistor FT10 decreases. As a result, the current $I_{SHO}$ flowing out from the current memory circuit becomes smaller than the memorized value. This leads to a corresponding increase in the current flowing through the MOS transistor FT0, and feedback operation occurs so that $I_{SHO}=I_{SH}'$ is achieved finally. Thus, the charges stored in the capacitor 1105 are influenced by another factor other than the background light. This means that the line sensor having the previously-proposed configuration shown in FIG. 13 cannot provide great improvement.

Figure 15:
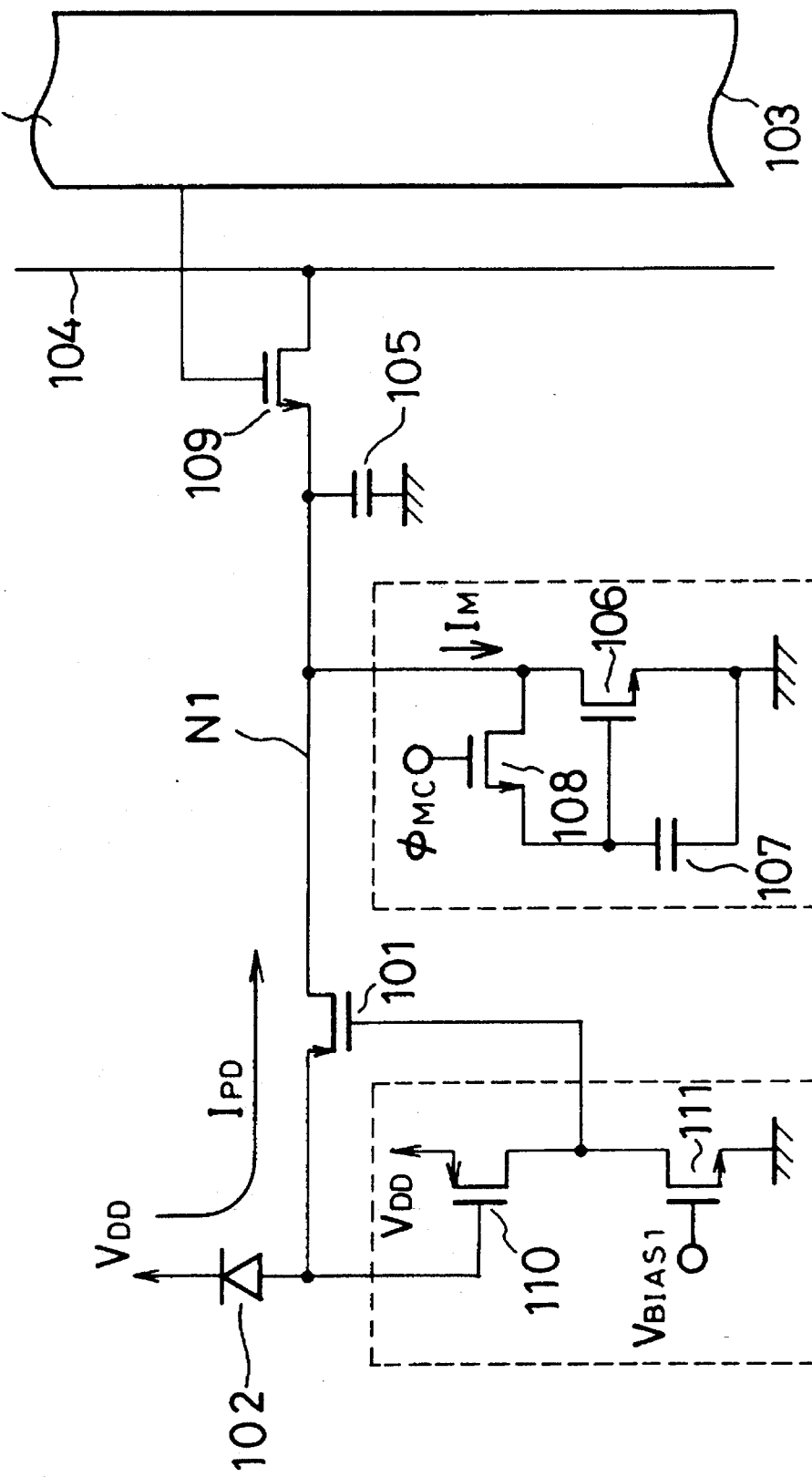
FIG. 15 is a circuit diagram illustrating one pixel of a sixth basic embodiment of a solid-state image pickup device, according to the present invention.

To solve the problem associated with the previously-proposed line sensor, a sixth embodiment of the present invention shown in FIG. 15 provides a basic technique of a solid-state image pickup device which can perform high accuracy cancellation of background light thereby providing output associated with the light projected by a light source.

FIG. 15 shows a circuit configuration of one pixel according to the sixth embodiment. In FIG. 15, reference numeral 101 denotes a transfer transistor whose source and drain are connected to a photodiode 102 and a storage capacitor 105, respectively. The gate of transfer transistor 101 is connected to the output of an inverter 112 comprising a transistor 110 in a common-source configuration and a load transistor 111 acting as a load of the transistor 110 wherein the gate of the load transistor 111 is connected to a fixed bias voltage $V_{BIAS1}$. The input of the inverter 112, that is the gate of the p-MOS transistor 110 in the common-source configuration, is connected to the photodiode 102. The inverter 112 and the transfer transistor 101 form a feedback loop so that the photodiode 102 may be maintained in an effective low impedance state whereby a constant bias voltage is applied to the photodiode 102. As a result, photo-induced charges induced in the photodiode 102 are transferred into a storage capacitor 105 via the transfer transistor 101 at a constant rate independent of the amount of the photo-induced charges.

A current memory circuit 113 is connected in parallel to the storage capacitor 105, wherein the current memory circuit 113 comprises a current memory transistor 106, a current memory capacitor 107, and a switching transistor 108 whose gate is supplied with a control pulse $\phi_{MC}$ thereby controlling a sample-and-hold operation of current to be memorized. This current memory circuit 113 operates as follows. When $\phi_{MC}$="H", that is, when the switching transistor 108 is in an ON state, feedback is made associated with the voltage across the current memory capacitor 107 connected between the source and gate of the current memory transistor 106 so that the current passing through a node N1 may equal the current flowing through the current memory transistor 106 between its source and drain. In this state, if $\phi_{MC}$ is changed to an "L" level, that is, if the switching transistor 108 is turned off, the voltage across the current memory capacitor 107 is held, and thus the current equal to the memorized current value $I_M$ continues to flow through the current memory transistor 106.

In addition to the basic configuration described above, the pixel has a selection transistor 109 for reading the signal charges stored in the storage capacitor 105 thereby selectively providing an output signal associated with each pixel on a video line 104. The gate of the selection transistor 109 is connected to a shift register 103. Pixels each having the above-described configuration are arranged in a one- or two-dimensional fashion so as to form a solid-state image pickup device.

The solid-state image pickup device configured in the above-described manner operates as follows. Pixels of the solid-state image pickup device operate in a manner described below so that the light projected from the light source may be read out while cancelling the background light. First, in a situation where there is no light projected from the light source, $\phi_{MC}$ is changed to an ON level so that the photo-induced current $I_{PD}$ generated in the photodiode 102 all flows into the current memory transistor 106, and thus $I_{PD}=I_M$. In this state, the potential at the node N1, that is the voltage across the storage capacitor 105 becomes equal to the gate-to-source voltage $V_{GS}$ of the current memory transistor 106 corresponding to the $I_M$. The switching transistor 108 is then changed from an ON state to an OFF state. If the feedthrough charges associated with the transistor 108 can be neglected, then the condition $I_{PD}=I_M$ is still maintained and the potential of the node N1 is held at a floating value equal to $V_{GS}$. In this situation, if light is projected from the light source, then a projection light component is added to the current flowing through a photodiode of a pixel which has received reflected light, and thus the photo-induced current becomes $I_{PD}+I_{PD}'$. As a result, the storage capacitor 105 stores only those charges which correspond to the current component $I_{PD}'$. After the completion of the light projection, the shift register 103 is scanned so as to read out the charges stored in the storage capacitor 105 on the video line 104 via the selection transistor 109. In this way, outputs of all pixels are detected so as to detect the position of the reflected projection light.

In the above procedure, if the background light is uniform across all pixels, then it is possible to perform accurate detection of a signal corresponding to the projection light. Even in the case where there is a contrast in the background light, if the current memory transistor 106 operates in a subthreshold region, $V_{GS}$ changes exponentially relative to $I_M$, and thus $V_{GS}$ changes as slightly as about 100 mV for a great change in the amount of light such as 10:1. If such a small error can be neglected in a practical application, the configuration shown in FIG. 15 can be used without further modifications. The error can be minimized, if desired, by adding a resetting transistor in such a manner that one end of the resetting transistor is connected to a reference voltage and the other end is connected to the node N1. With this arrangement, after $\phi_{MC}$ is changed to an OFF level, the resetting transistor is turned on so as to reset the node N1 to the reference voltage. The resetting transistor is then turned off, and light is projected from the light source.

In the embodiment shown in FIG. 15, as described above, the photodiode 102 is maintained in a low impedance state by the transfer transistor 101 and the inverter 112, and the photodiode current $I_{PD}$ flows into the node N1. Only when sampling is performed by the current memory circuit 113, that is, only when the transistor 108 is in an ON state, the impedance of the node N1 becomes low due to the short circuit between the gate and drain of the current memory transistor 6, thereby resetting the potential of the node N1. When the transistor 108 is turned off, the node N1 changes to a floating state, as a result of which the storage capacitor 5 stores charges corresponding to the difference between the $I_{PD}$ and $I_M$. Since the potentials of all nodes are determined uniquely in this way, there is no error due to the competition in potential between the MOS transistors FT0 and FT6 in low impedance states, which may occur in conventional techniques. Therefore, the configuration of the present embodiment can provide precise cancellation of the background light thereby detecting only the reflected projection light.

Figure 16:
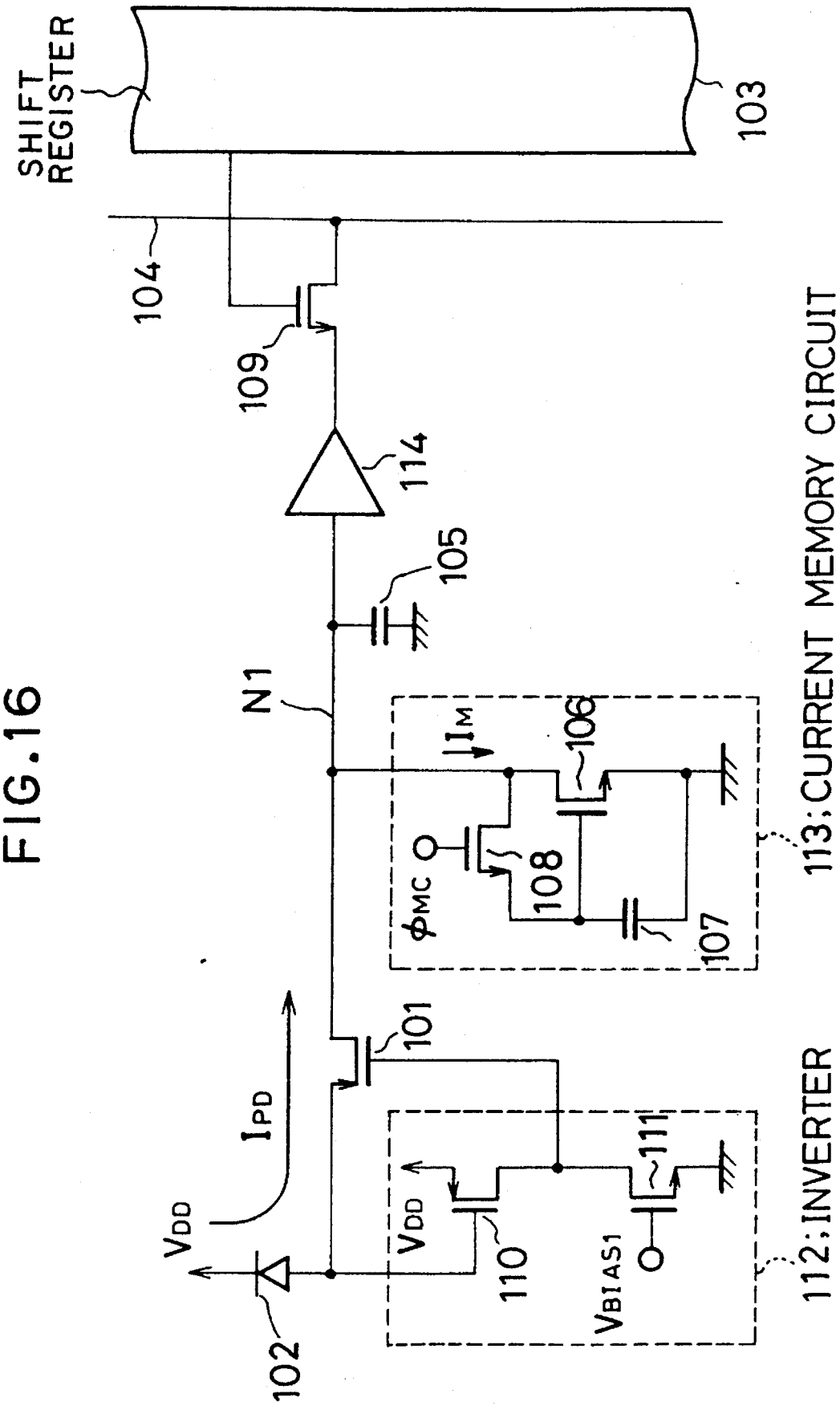
FIG. 16 is a schematic diagram illustrating a basic idea of a seventh embodiment according to the present invention.
Figure 17:
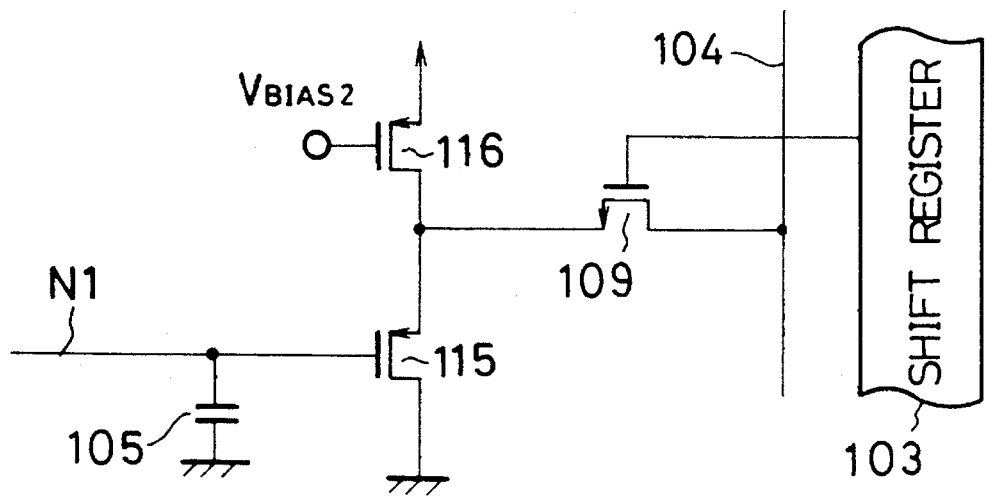
FIG. 17 is a schematic diagram illustrating a specific amplifier configuration for use in the seventh embodiment shown in FIG. 16.
Figure 18:
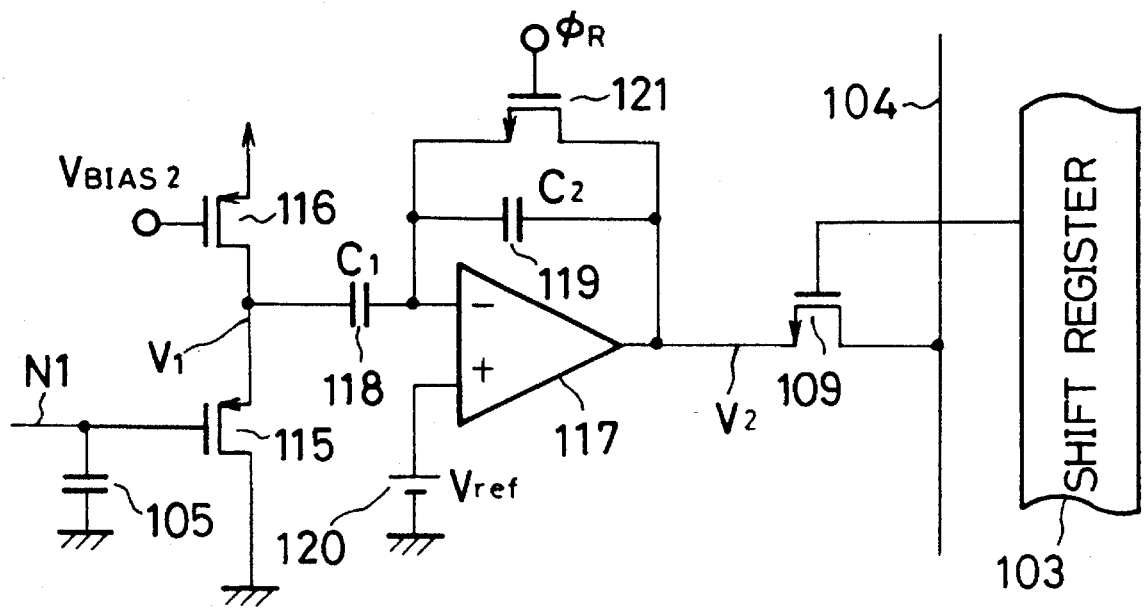
FIG. 18 is a schematic diagram illustrating another amplifier configuration for use in the seventh embodiment shown in FIG. 16.
Figure 19:
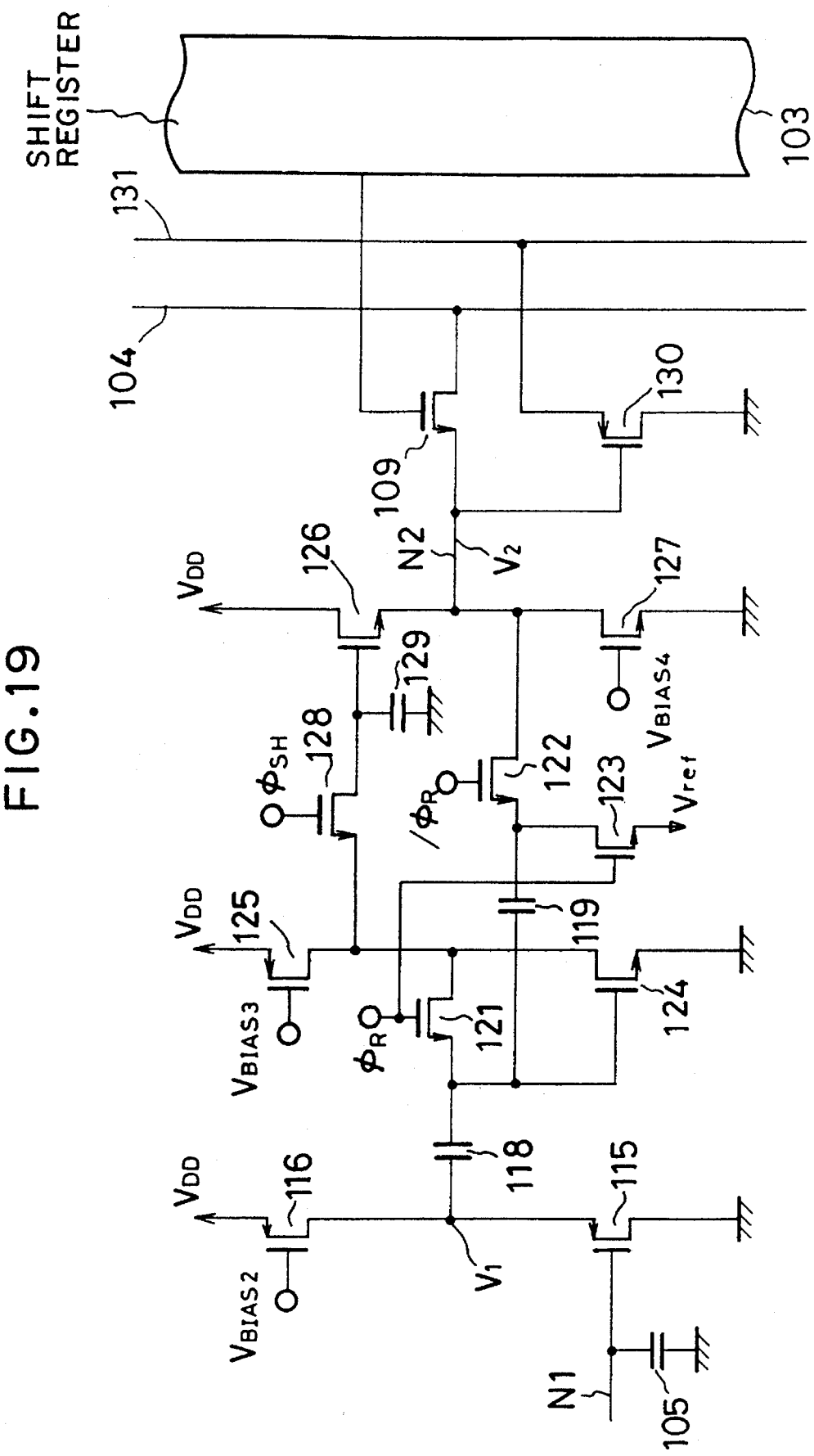
FIG. 19 is a schematic diagram illustrating still another amplifier configuration for use in the seventh embodiment shown in FIG. 16.

A seventh embodiment, which is an improved embodiment of the sixth embodiment shown in FIG. 15, will be described below. FIG. 16 illustrates a basic idea associated with the seventh embodiment. Specific configurations according to the seventh embodiment are shown in FIGS. 17, 18, and 19. In the sixth embodiment shown in FIG. 15, the charges stored in the storage capacitor 105 are read out by directly connecting the storage capacitor 105 to the video line 104. However, this read-out technique has a disadvantage that when the number of pixels increases, the capacitance of the video line also increases, and thus degradation in the signal-to-noise ratio occurs. The seventh embodiments provides read-out means which can perform read-out operation without degradation in the signal-to-noise ratio even in the case where the capacitance of the video line becomes large. In the seventh embodiment, the read-out means comprises a storage capacitor 105, a selection transistor 109, and an amplifier 114 disposed between the storage capacitor 105 and the selection transistor 109. The amplifier 114 can provide an amplified output corresponding to the voltage across the storage capacitor 105 via the selection transistor 109 without degradation in the signal-to-noise ratio due to the capacitance associated with the video line.

FIG. 17 shows a specific example of the configuration of the amplifier. In this example, the amplifier comprises a p-MOS transistor 115 configured as a source follower and a transistor 116 whose gate is connected to a fixed voltage $V_{BIAS2}$ so that the transistor 116 acts as a constant-current source, wherein the p-MOS transistor 115 and the transistor 116 are connected in series to each other. By employing such a source follower configuration, an amplifier may be added easily without a significant increase in the circuit complexity. In this example, a contrast in the background light can also influence the output. This can be prevented, if there is provided a resetting transistor wherein its one end is connected to the node N1 and the other end is connected to the reference voltage $V_{ref}$.

FIG. 18 shows another example of the amplifier which can provide higher accuracy and a higher signal-to-noise ratio in the read-out operation. In connection with the sixth embodiment shown in FIG. 15 and the configuration shown in FIG. 17, it has been described that a contrast in the background light leads to a difference in initial potential among the storage capacitors 105, and that this can be prevented by adding a resetting transistor such that the resetting transistor is connected to the node N1. However, when the voltage at the node N1 is reset to the reference voltage by the resetting transistor, the source-to-drain voltage of the current memory transistor 106 of the current memory circuit 113 differs from the source-to-drain voltage of the current memory transistor 106 had when the current was sampled. As a result, a deviation in the memorized current $I_M$ occurs, which leads to an error. To solve this problem, the present embodiment provides a configuration shown in FIG. 18 by which only a signal corresponding to the projection light may be exactly extracted without using a resetting transistor connected to the node N1. In this configuration, an operational amplifier 117 is disposed at a stage subsequent to the source follower shown in FIG. 17 such that the operational amplifier 117 is connected to the output of the source follower via a capacitor 118 (capacitance $C_1$), wherein the positive side input of the operational amplifier 117 is connected to a reference voltage $V_{ref}$, and the output and the negative side input of the operational amplifier 117 are coupled to each other via a parallel connection of a feedback capacitor 119 (capacitance $C_2$) and the resetting transistor 121 which is controlled by a resetting pulse $\phi_R$.

In this configuration, during a time period in which $\phi_{MC}$=ON, $\phi_R$ is also kept at an ON level. $\phi_{MC}$ is then changed from the ON level to an OFF level, and further $\phi_R$ is changed from the ON level to an OFF level, thereby providing an output $V_2$ which can be represented by the following equation (6):

$$V_2 = V_{ref} - (C_1/C_2) \times \Delta V_1 \quad (6)$$

As can be seen from equation (6), the output $V_2$ includes only the varying component $\Delta V_1$. Therefore, even in the case where there are differences in the initial potential at the node N1 among the pixels, only the change in the voltage across the storage capacitor 105 corresponding to the projection light can appear at the output. Thus, the projection light can be detected accurately.

This configuration also has the following advantages. If the capacitance of the storage capacitor 105 is small, when $\phi_{MC}$ is changed to an OFF level, a large resetting noise voltage occurs. If resampling with $\phi_R$ is performed using the feedback capacitor 119 having a large capacitance $C_2$, then the resetting noise due to the $\phi_{MC}$ may also be removed. Therefore, this configuration can provide a better signal-to-noise ratio than that of the example shown in FIG. 17.

However, the configuration shown in FIG. 18 has a disadvantage that if there are variations in the offset voltage of the operational amplifier 117 among pixels, these variations in the offset voltage generate fixed pattern noise (FPN). In view of the above, in another example configured as shown in FIG. 19, the read-out signal may be sampled and held, and the FPN may be suppressed. The configuration shown in FIG. 19 comprises: an inverting amplifier comprising an n-MOS transistor 124 in a common-source configuration and a transistor 125 acting as a load; and a sample-and-hold circuit comprising a sample-and-hold switching transistor 128, a holding capacitor 129, an n-MOS transistor 126 in a source follower configuration, and a transistor 127 acting as a load of the n-MOS transistor 126; wherein the inverting amplifier and the sample-and-hold circuit are connected to each other in a cascade fashion; and wherein the input and the output, that is, the gate of the n-MOS transistor 124 and the source of the n-MOS transistor 126, are coupled to each other for providing the feedback via a series connection of a capacitor 119 and a transistor 122 which is controlled by/$\phi_R$ having an inverted phase relative to that of the resetting pulse $\phi_R$. Furthermore, the output of a source follower comprising a transistors 115 and 116 is connected to the input of the inverting amplifier via a capacitor 118 There are also provided two resetting transistors 121 and 123 for initializing the capacitors 118 and 119.

The above configuration is derived by applying U.S. patent application Ser. No. 08/001,656 filed by the present inventor of the present invention. Therefore, the operation of this configuration is described in the above Patent Application in more detail. However, this configuration further includes a p-MOS transistor 128 whose gate is connected to the output node N2 so that the p-MOS transistor 128 may operate as a source follower to provide a signal for detecting and monitoring the peak value of the output. The source of the p-MOS transistor 130 is connected together with sources of monitor transistors in other pixels to a monitor line 131. This monitor transistor forms a peak detecting circuit which outputs a signal corresponding to the lowest voltage among voltages at output nodes N2 of all pixels.

Figure 20:
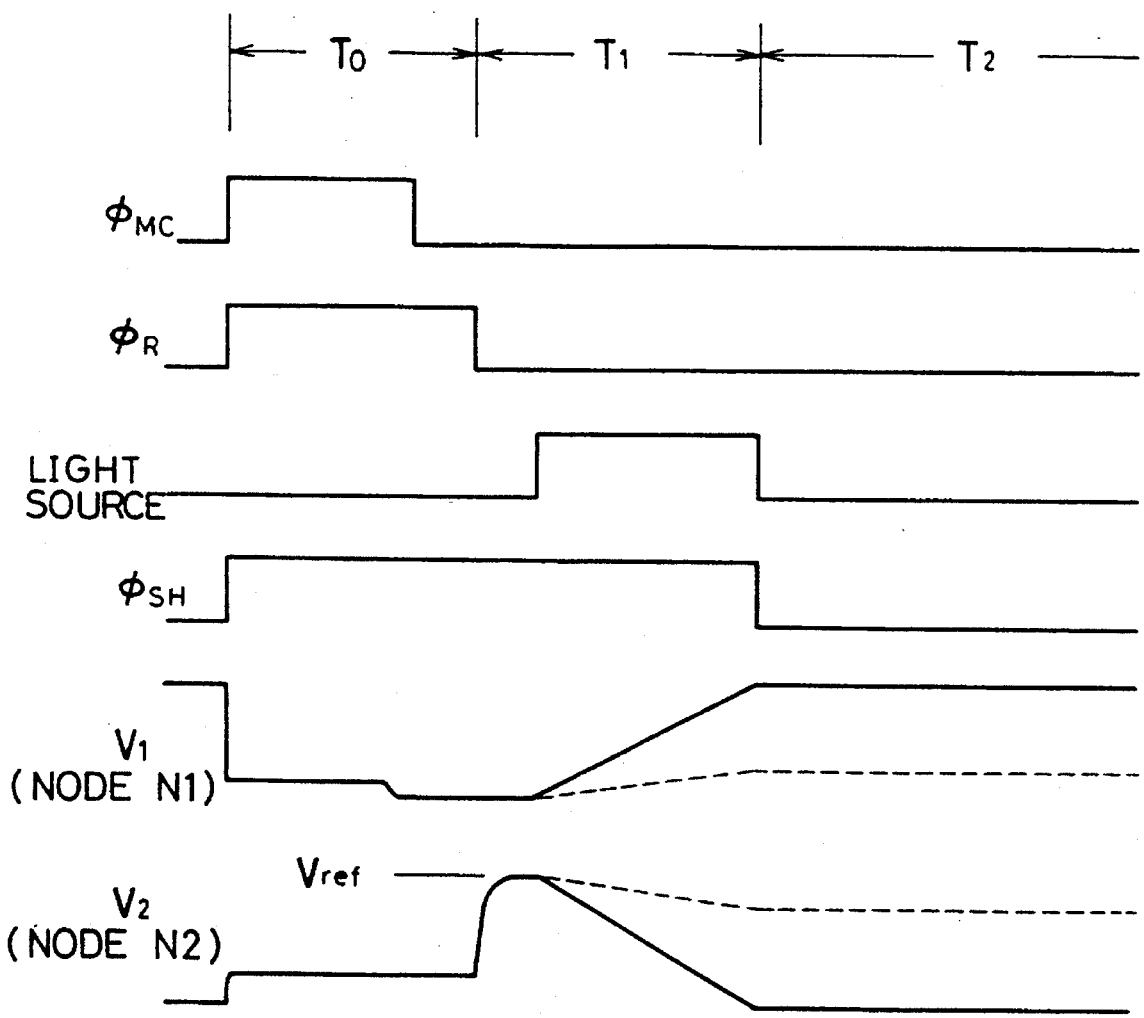
FIG. 20 is a timing chart illustrating the operation of the configuration shown in FIG. 19.

Now, referring to the timing chart shown in FIG. 20, the operation will be described for the case where the configuration shown in FIG. 19 is used as the amplifier 114 shown in FIG. 16. In FIG. 20, a resetting operation is performed during a time period $T_0$ in which $\phi_{MC}$ is at an "H" level so that the background light may be memorized in the current memory circuit 113, and so that the capacitors 118 and 119 of the amplifier may be reset. When $\phi_{MC}$ is then changed from "H" to "L", the feedthrough charges of the switching transistor 108 gives rise to a slight change in the potential at the node N1. Therefore, $\phi_R$ is changed from "H" to "L" slightly later after the falling edge of $\phi_{MC}$.

During the subsequent time period $T_1$, integration associated with the project light is performed. $\phi_R$ is changed from "H" to "L", whereby the potential $V_2$ at the node N2 rises up to the $V_{ref}$. After that, light is emitted from a light source. As a result of this, the potential at the node N1 of a pixel which has received the reflected light rises by an amount corresponding to the received light. In contrast, the potential at the node N2 drops by the corresponding amount from the $V_{ref}$. In FIG. 20, solid lines with notations $V_1$, $V_2$ represent the potential changes of pixels which have received a large amount of reflected light, and broken lines represent the potential changes of pixels which have received a small amount of reflected light. During the above operation, the potential at the monitor signal terminal is monitored. When the potential reaches a predetermined level, the emission of the light from the light source is stopped, and $\phi_{SH}$ is changed from an ON level to an OFF level so as to stop the integral operation. The potential associated with each pixel is held at the value each pixel had when the integral operation was complete. During a time period $T_2$, these potentials are read out sequentially by means of scanning of the shift register so as to obtain a signal associated with the projection light.

In the configuration shown in FIG. 19, as described above, the signal varies relative to the reference voltage $V_{ref}$ without influence of the variations in $V_{TH}$ of transistors. Thus, the FPN can be suppressed. Furthermore, as in the embodiment shown in FIG. 18, the error in the memorized current arising from the variation in the source-to-drain voltage of the current memory transistor 106 can be reduced, and the resetting noise associated with the storage capacitor 105 and the switching transistor 108 can also be removed.

In the embodiment described above, there is disclosed a technique to improve a read-out circuit. One factor causing the error in the current memory circuit 113 of the sixth and seventh embodiments shown in FIG. 15 or 16 is a component due to the variation in the source-to-drain voltage $V_{GS}$ of the current memory transistor 106, arising from the intrusion of the feedthrough charges induced in the switching transistor 108 into the storage capacitor 105, wherein the feedthrough charges are induced when the switching transistor 108 is turned off.

Figure 21:
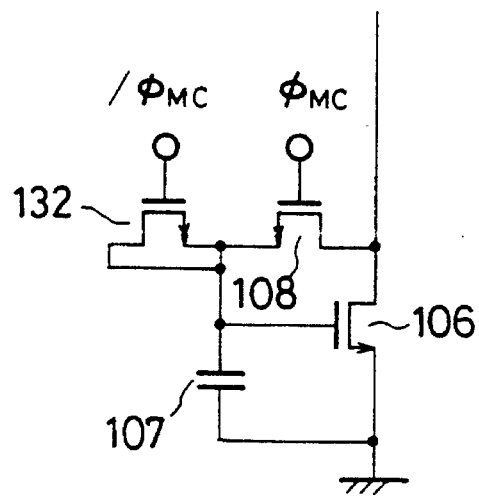
FIG. 21 is a circuit diagram illustrating major parts of an eighth embodiment according to the present invention.

This error can be suppressed according to an eighth embodiment which will be described below in connection with FIG. 21. In this embodiment, a transistor 132 is added to the current memory capacitor 107 of the current memory circuit 113, wherein the source and the drain of the transistor 132 are short-circuited, and wherein the transistor 132 is driven by a pulse/$\phi_{MC}$ having an inverted phase relative to $\phi_{MC}$. Since the transistor 132 operates in an inverted phase with the $\phi_{MC}$, charges are generated which have a polarity opposite to that of the feedthrough charges generated in the switching transistor 108. Therefore, if dimensions of the transistors 108 and 132 are selected properly, it is possible to cancel the feedthrough charges.

Now, a ninth embodiment will be described below, which can provide higher accuracy to a current memory circuit. The drain current $I_D$ of the current memory transistor 106 corresponding to a given value of $V_{GS}$ can be approximated by an exponential function as shown in the following equation 7 for small drain currents in a subthreshold region.

$$I_D = I_0 \exp(V_{GS}/V_{T0}) \qquad (7)$$

If $I_D$ changes by $\Delta I_D$ due to a change in $V_{GS}$ by $\Delta V_{GS}$, then $$I_D + \Delta I_D = I_0 \exp[(V_{GS} + \Delta V_{GS})/V_{T0}] \qquad (8)$$

From the above equations 7 and 8, the following equation 9 can be obtained.

$$(I_D + \Delta I_D)/I_D = \exp(\Delta V_{GS}/V_{T0}) \qquad (9)$$

In the above equations, $V_{T0}$ is a constant having a dimension of voltage, and $I_0$ is a constant having a dimension of current.

If it is assumed that the subthreshold characteristic of an MOS transistor gives a change in $I_D$ over a range of a factor of 10 corresponding to a change in $V_{GS}$ of about 100 mV, then $V_{T0}$=43 mV. Therefore, $\Delta V_{GS}$<4 mV is required to obtain an error less than 10%, and $\Delta V_{GS}$<0.4 mV is required to obtain an error less than 1%. In a technique for cancelling the feedthrough charges by means of an inverted phase as in the eighth embodiment shown in FIG. 21, it is difficult to achieve an error less than 1%, since the error is influenced by the variations in dimensions or threshold voltages $V_{TH}$ of the transistors 108 and 131 arising from the production process variations. This technique has also another disadvantage that it is required to employ a large capacitance for the current memory capacitor 107 to obtain good accuracy, which gives rise to an increase in a chip area and an increase in a sampling time for memorizing a current.

Figure 22:
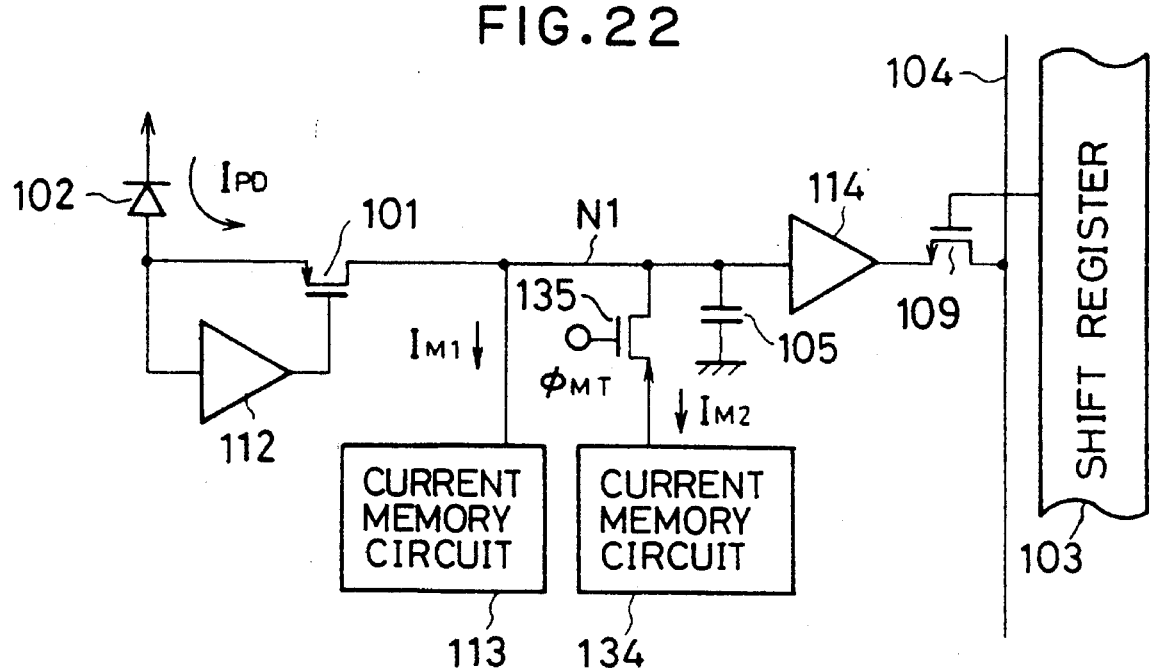
FIG. 22 is a circuit diagram illustrating a ninth embodiment according to the present invention.

FIG. 22 illustrates a configuration according to the ninth embodiment, which can provide higher accuracy using a relatively small capacitance. The configuration of this embodiment can be obtained by adding a current memory circuit 134 and a switching transistor 135 to the configuration according to the seventh embodiment shown in FIG. 16 such that the current memory circuit 134 is connected to the node N1 via the switching transistor 135 which is driven by $\phi_{MT}$, wherein the current memory circuit 134 has the same configuration as that of the current memory circuit 113.

The circuit of this embodiment operates as follows. First, $\phi_{MT}$ is made to be at an "L" level so that the transistor 135 may be in an OFF state thereby memorizing a photodiode current $I_{PD}$ in the current memory circuit 113. The transistor 108 is then turned off so as to make the current memory circuit 113 be in a holding state, in which $I_{PD}$<$I_{M1}$ due to the feedthrough charges. After that, $\phi_{MT}$ is changed to an ON level so that $(I_{PD}-I_{M1})$ may be memorized as $I_{M2}$ in the current memory circuit 134. If it is assumed that a remainder of 10% exists in the first operation, and that this remainder can be further cancelled with accuracy ±1/10 in the second operation, then it is possible to achieve a total error (positive or negative remainder) less than 1%. In other techniques, it is generally required to increase the memory capacity ten times to improve the accuracy from 10% to 1%. According to the present embodiment, however, it is possible to improve the accuracy ten times by increasing the transistor area as slightly as twice.

Figure 23:
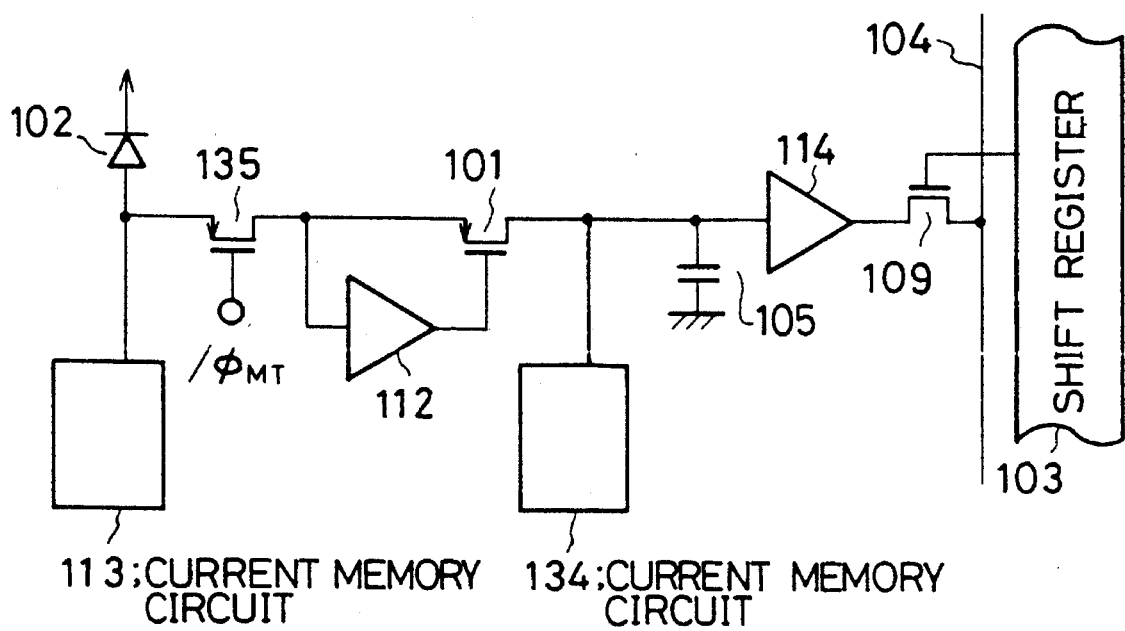
FIG. 23 is a circuit diagram illustrating a modification of the ninth embodiment shown in FIG. 22.

FIG. 23 shows an example of a modification of the ninth embodiment. In the ninth embodiment shown in FIG. 22, current memory circuits are connected in parallel to the node N1. Instead, the additional current memory circuit may also be connected to the photodiode 102 as shown in FIG. 23. In this configuration, the transistor 135 is first turned off so that a current may be memorized in the current memory circuit 113, and then the residual current is removed by the current memory circuit 134. This modification is useful compared to the configuration shown in FIG. 22 especially when it is desired not to increase the parasitic capacitance associated with the node N1.

The next embodiment described below deals with a technique based on a viewpoint different from those in the embodiments shown in FIGS. 15–23. That is, this embodiment relates to a technique to suppress the feedthrough which occurs during the switching operations of the current memory circuit. One technique to suppress the feedthrough is to reduce the total amount of feedthrough charges. This can be achieved by reducing the dimensions of the switching transistor 108 and by minimizing the amplitude of the driving pulse $\phi_{MC}$. For that, it is required to reduce the supply voltage of the driving circuit of the driving pulse $\phi_{MC}$, relative to the other pulses. Furthermore, the feedthrough charges vary depending on the $V_{TH}$ of transistors, in the technique to cancel the feedthrough as in the embodiment shown in FIG. 21. The influence of the $V_{TH}$ can be minimized if the amplitude of the driving pulse $\phi_{MC}$ is varied according to the $V_{TH}$ of the transistor.

Figure 24:
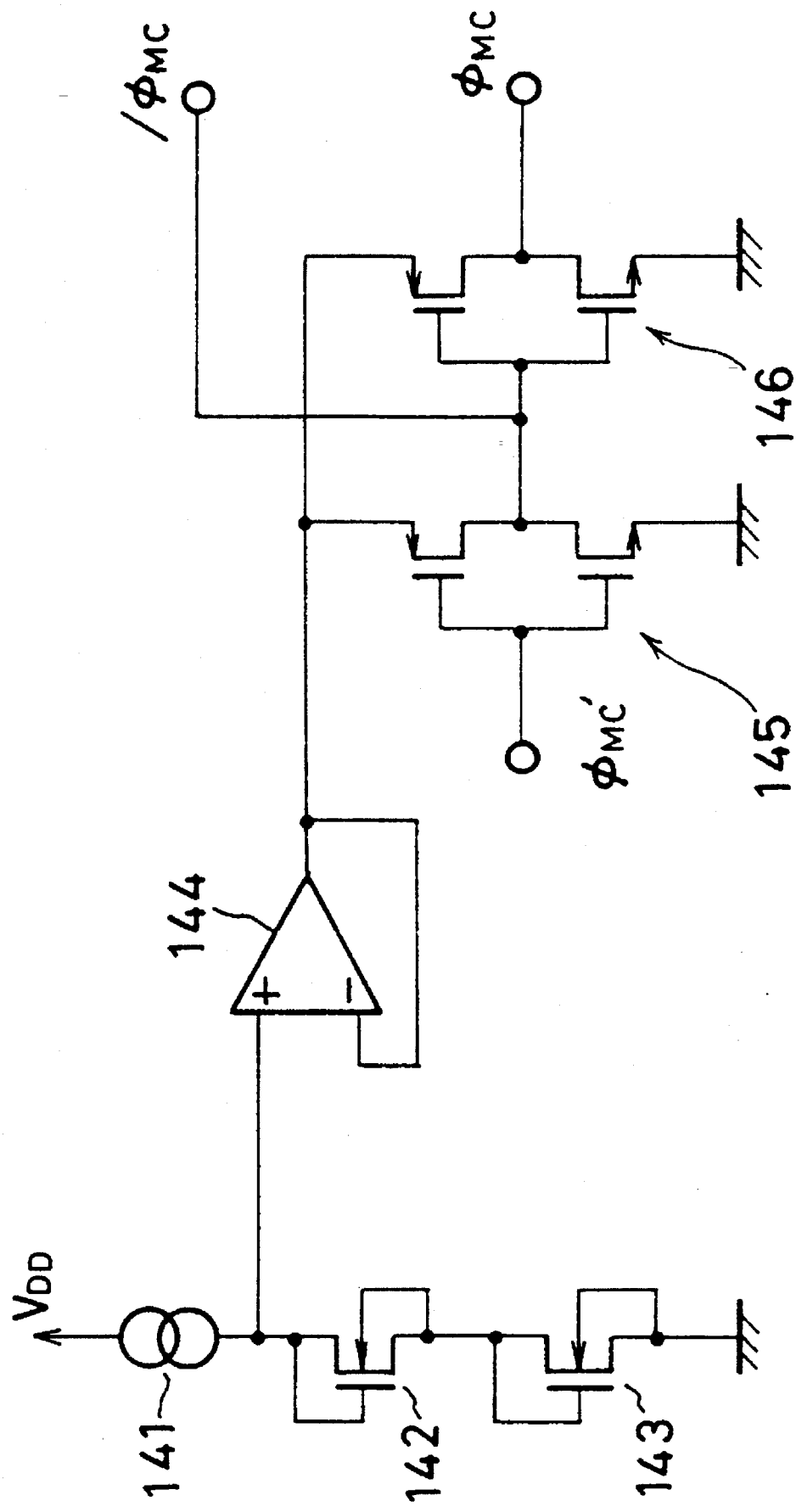
FIG. 24 is a circuit diagram illustrating major parts of a tenth embodiment according to the present invention.

FIG. 24 shows an example of a driving pulse generator according to the tenth embodiment, in which the amplitude of the driving pulse $\phi_{MC}$ varies according to the $V_{TH}$. This driving pulse generator comprises a constant-current source 141 and transistors 142, 143 whose respective gates are directly connected to their own drains, wherein the constant-current source 141 is connected to the vertical cascade connection of the transistors 142, 143. Furthermore, the output voltage of the two-level vertical cascade connection of transistors is amplified by a buffer amplifier 144. The output of the buffer amplifier 144 is applied to the inverters 145 and 146 as their power supply voltages. A pulse $\phi_{MC}'$ having an amplitude equal to the power supply voltage is applied to the input of the inverter 145.

In this driving pulse generator, the supply voltage to the inverters 145 and 146 is equal to 2×$V_{TH}$. Hence, the amplitudes of/$\phi_{MC}$ and $\phi_{MC}$ also become equal to 2×$V_{TH}$. As a result, the influence of the feedthrough charges due to the variations in $V_{TH}$ can be suppressed.

Figure 25:
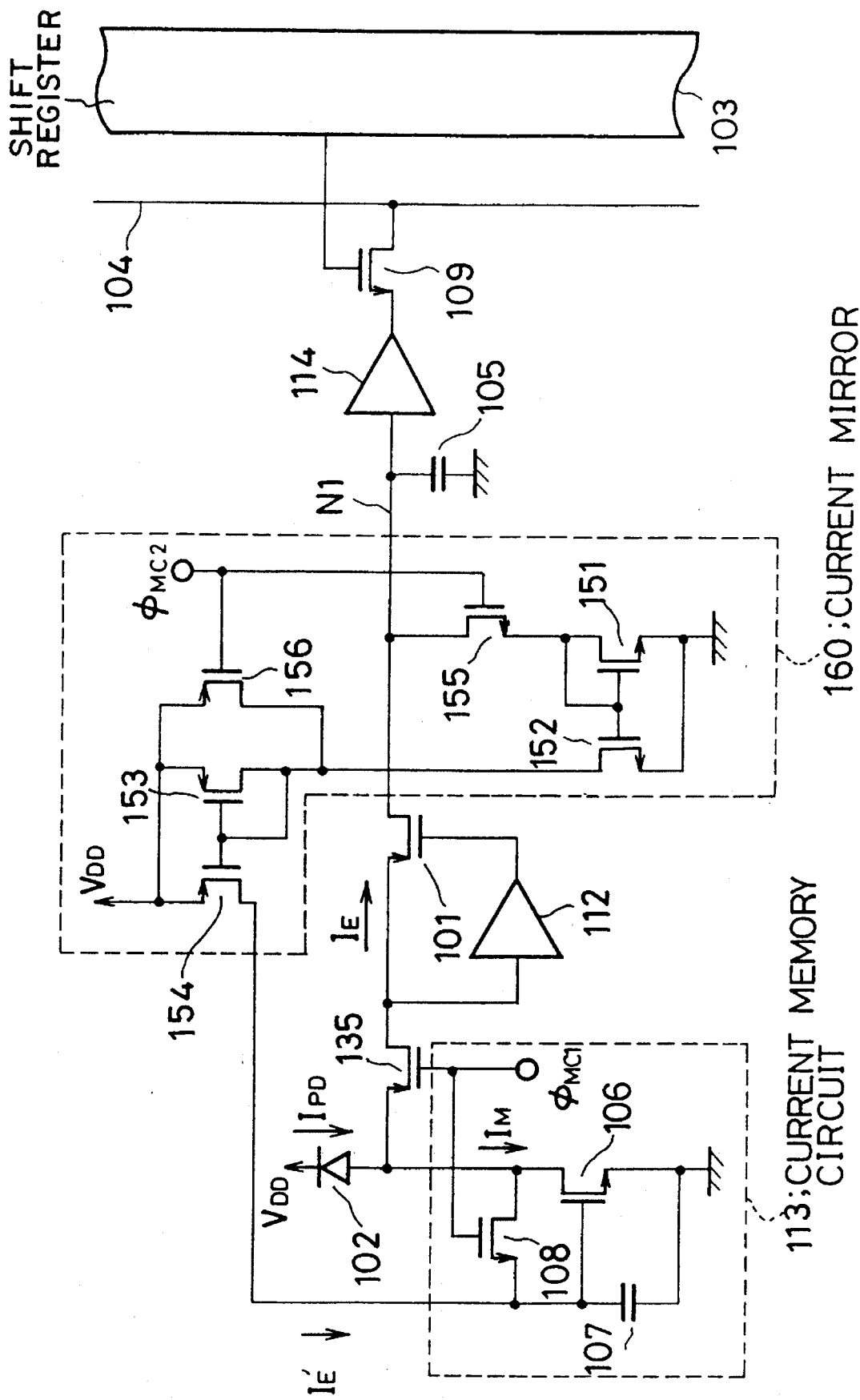
FIG. 25 is a circuit diagram illustrating an eleventh embodiment according to the present invention.

In the above description, there are disclosed various embodiments of detection cells which can cancel the background light using a current memory circuit. However, an eleventh embodiment described below can provide not only precise cancellation of the background light but also expansion of the dynamic range. FIG. 25 shows a circuit configuration according to the eleventh embodiment, which can be obtained by further modifying the modification shown in FIG. 23 of the ninth embodiment. In the case of the modified example shown in FIG. 23, the residual current which occurs as a result of the subtracting operation by the current memory circuit 113 connected to the photodiode 102 is removed by the other current memory circuit 134. In contrast, in the present embodiment shown in FIG. 25, the residual current is detected, and this information is fed back to the storage capacitor 105 of the current memory circuit 113 so that the residual current component may be removed, thereby deleting the current error.

The portions different from those in the example shown in FIG. 23 will be described below. The node N1 is connected via a transistor 155 to a current mirror comprising transistors 151 and 152. The other output (the drain of the transistor 152) of symmetrical outputs of the current mirror is connected to a current mirror comprising transistors 153 and 154. The other output (the drain of the transistor 154) of symmetrical outputs of this current mirror is connected to a current memory capacitor 107 of a current memory circuit 113. Except for the current mirror 160 configured in the above-described manner, the embodiment has the same configuration as that of the modified example shown in FIG. 23.

The operation of the eleventh embodiment having the above-described configuration will be described below. First, $\phi_{MC1}$ is made to be at an "H" level so that the transistor 135 is turned off. As a result, all $I_{PD}$ flows into the current memory 113, and thus $I_{PD}=I_M$. After that, when $\phi_{MC1}$ is changed from "H" to "L" the voltage across the current memory capacitor 107 drops due to the feedthrough effect of the switching transistor 108, that is, the $V_{GS}$ of the current memory transistor 106 drops. As a result, $I_M$ becomes less than the initially memorized value of $I_{PD}$. When $\phi_{MC1}$ is then changed to "L", the transistor 135 is turned on, whereby a current $I_E$ equal to the difference between $I_{PD}$ and $I_M$ flows to the node N1. In this situation, if $\phi_{MC2}$ is kept at an "H" level, then the current $I_E$ flows into the drain of the transistor 151 of the current mirror. Therefore, the output current $I_E'$ provided from the drain of the transistor 154 as a symmetrical current of two current mirrors can be written as $$I_E' = \alpha I_E \quad (10)$$

where α is a constant determined by the ratio of W/L of the transistor 151 to W/L of the transistor 152 as well as the ratio of W/L of the transistor 153 to W/L of the transistor 154, wherein in the case where dimensions of the transistors 151 and 152 are equal, and the dimensions of the transistors 153 and 154 are equal, then $I_E'=I_E$.

In this way, the current $I_E$ induces the current $I_E'$ as the symmetrical current of the current mirror, thereby charging the current memory capacitor 107. Therefore, if there is a difference $I_E$ between $I_{PD}$ and $I_M$ ($I_E=I_{PD}-I_M$) after $\phi_{MC1}$ has been changed from "H" to "L", the current memory capacitor 107 is charged by $I_E'$. As a result, $V_{GS}$ increases and thus $I_M$ also increase. In this way, the feedback operation occurs so that $I_{PD}=I_M$, and thus $I_E=0$. $\phi_{MC2}$ is then changed from "H" to "L". In this transition, in order that the potential of the common gates of the transistors 153 and 154 may be maintained unchanged, the potential is fixed to $V_{DD}$ using a p-MOS switching transistor 156, thereby turning off the transistor 154 completely. In this state, light is projected from the light source. As a result of the light projection, only photo-induced charges corresponding to the reflected projection light are stored in the storage capacitor 105. After that, the outputs corresponding to the voltages across the storage capacitors 105 are read out via the video line 104 by scanning the shift register 103 in the same manner as in the cases of the embodiments shown in FIGS. 16–19.

This embodiment has two advantages, which will be described below, over the embodiments described in connection with FIGS. 15–23. First, since feedback current $I_E$ decreases gradually, the gate of the transistor 154 changes gradually toward an OFF state. As a result, the feedthrough effects of the switching transistors 155 and 156 are very slight. Therefore, the currents generated in the photodiode 102 can be memorized with high accuracy. Second, when $I_E$ becomes small, the potential at the node N1 also drops down near 0 V. However, in the cases of the embodiments shown in FIGS. 15–23, the initial voltage is equal to $V_{GS}$. Therefore, the present embodiment has a greater dynamic range by the amount corresponding to the potential drop than those of the embodiments shown in FIGS. 15–23.

As described above, the present embodiment provides high accuracy cancellation of the background light. Moreover, the present embodiment is suitable for applications of low supply voltage operations.

The amplifier 114 may be removed from the circuit as in the basic embodiment described in connection with FIG. 15. The amplifier 114 may be configured in the same manner as in the embodiments shown in FIGS. 17–19.

A twelfth embodiment described below provides further improvement of the eleventh embodiment shown in FIG. 25. In the eleventh embodiment shown in FIG. 25, when $\phi_{MC1}=$ "H" and thus when the current memory circuit 113 is performing a sampling operation, the potential at the anode of the photodiode 102 is equal to $V_{GS6}$ which is determined depending on $I_M$ and the transistor 106. On the other hand, when $\phi_{MC1}=$"L", the potential at the anode of the photodiode 102 is determined by the inverter 112. If the inverter 112 is constructed with a p-MOS transistor 110 in a common-source configuration and an n-MOS transistor 111 acting as a load, as in the case of the first embodiment shown in FIG. 15, the potential at the anode of the photodiode 102 can be represented as $(V_{DD}-V_{GS10})$ where $V_{GS10}$ is the gate-to-source voltage of the p-MOS transistor 110.

As described above, the voltage across the photodiode 102 changes from $V_{DD}-V_{GS6}$ to $V_{GS10}$ when $\phi_{MC1}$ is changed over. If it is assumed that the photodiode has a capacitance $C_{PD}$, charges equal to $C_{PD} \times (V_{DD}-V_{GS6}-V_{GS10})$ flow through the transfer transistor 101, and are further reflected back from the current mirror 160 thereby charging up the current memory capacitor 107. Therefore, it is required that the feedthrough charges induced in the transistor 108 should be greater than the charges reflected back from the current mirror 160. However, if the capacitance $C_{PD}$ of the photodiode is large, the transistor 108 should have large dimensions corresponding to the capacitance $C_{PD}$. This gives rise to a problem that the dimensions of the transistor 108 may become impractical great.

Figure 26:
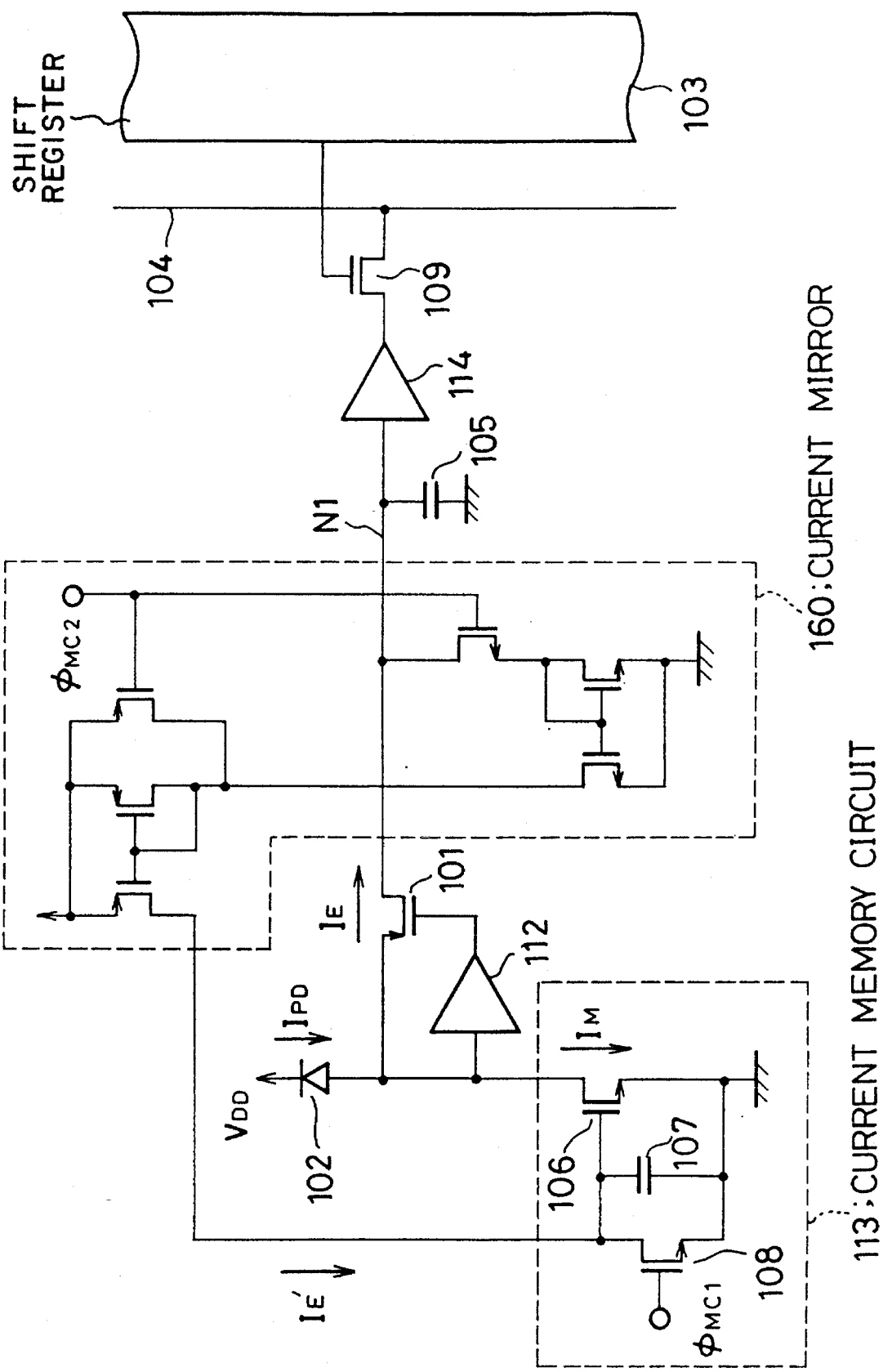
FIG. 26 is a circuit diagram illustrating a twelfth embodiment according to the present invention.

In the twelfth embodiment, this problem is solved by applying a constant voltage to the photodiode 102. This is accomplished, as shown in FIG. 26, by altering the connection of the switching transistor 108 of the current memory circuit 113 of the eleventh embodiment shown in FIG. 25 such that the switching transistor 108 is connected between the gate and source of the current memory transistor 106 instead of between the gate and drain. In this modification, since the applied voltage to the photodiode 102 is always determined by the inverting amplifier 112, the switching transistor 135 used in the eleventh embodiment shown in FIG. 25 is no longer necessary.

Figure 27:
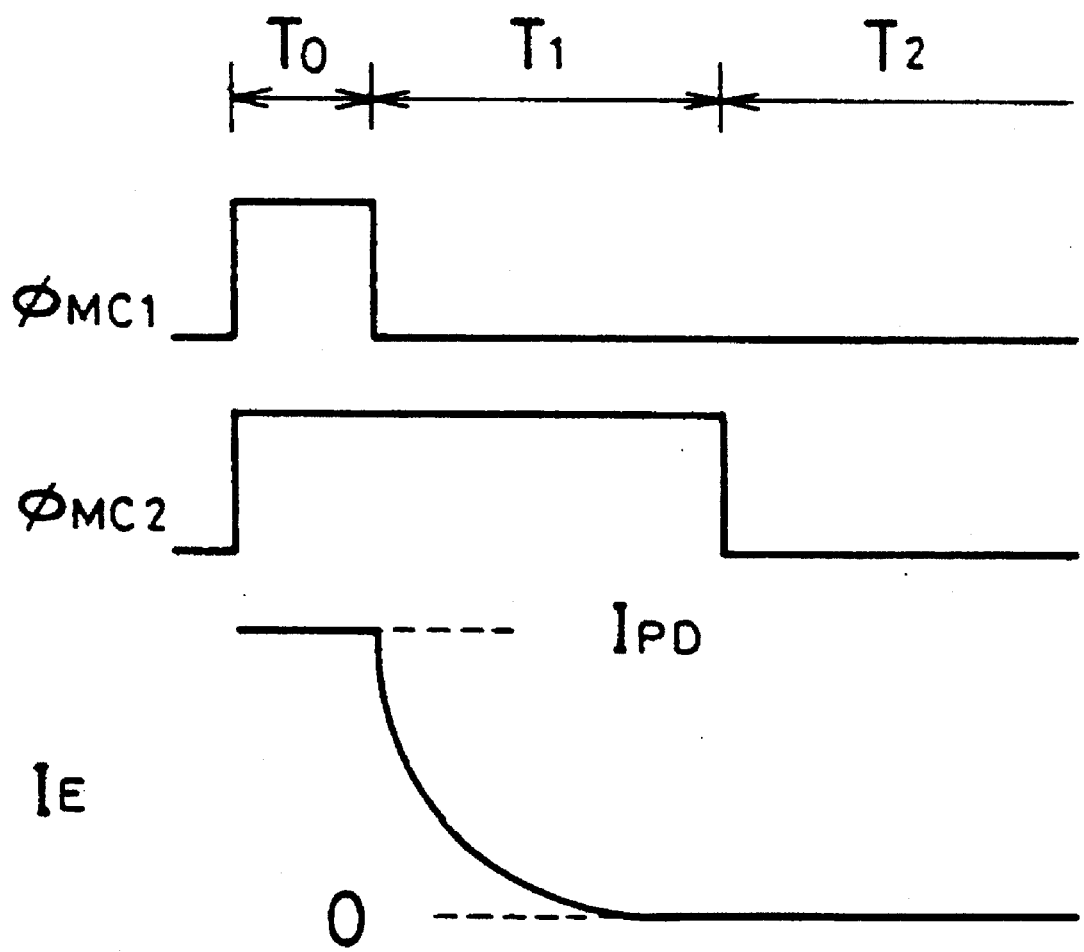
FIG. 27 is a timing chart illustrating the operation of the twelfth embodiment shown in FIG. 26.

Referring to the timing chart shown in FIG. 27, the operation of the twelfth embodiment will be described below. In an initial state, $\phi_{MC1}=\phi_{MC2}=$"H", and thus $V_{GS}$ of the current memory transistor 106 is nearly equal to 0 V and $I_M=0$. Therefore, the photodiode current $I_{PD}$ all flows into the current mirror 160 via the transfer transistor 101. As a result, the current $I_E'$ reflected back from the current mirror becomes $\alpha \cdot I_{PD}$. When $\phi_{MC1}$ becomes "L", $I_E'$ charges up the current memory capacitor 107. As a result, the $V_{GS}$ of the current memory transistor 106 rises, and $I_M$ starts to flow. Hence, $I_E$ becomes $(I_{PD} - I_M)$, and drops gradually. This continues until $I_{PD}$ becomes equal to $I_M$, that is, until $I_E$ becomes 0. $\phi_{MC2}$ is then changed to "L". After that, the light projection is performed in the same manner as in the previous embodiments.

In the twelfth embodiment, the potential of the photodiode is always maintained constant, and the source-to-drain voltage of the current memory transistor 106 is also maintained constant. As a result, it is possible to achieve high accuracy cancellation of the background light without problems occurring in the eleventh embodiment shown in FIG. 25.

However, if the capacitance of the current memory capacitor 107 is increased so as to improve the accuracy, it takes along time to charge up the current memory capacitor 107 for a low level of background light. This problem can be solved as follows. The current $I_E'$ by which the current memory capacitor 107 is charged up has a relationship that $I_E' = \alpha I_E$. Therefore, if $\alpha$ is changed over to a greater value for a dark background, then the problem will be solved.

Figure 28:
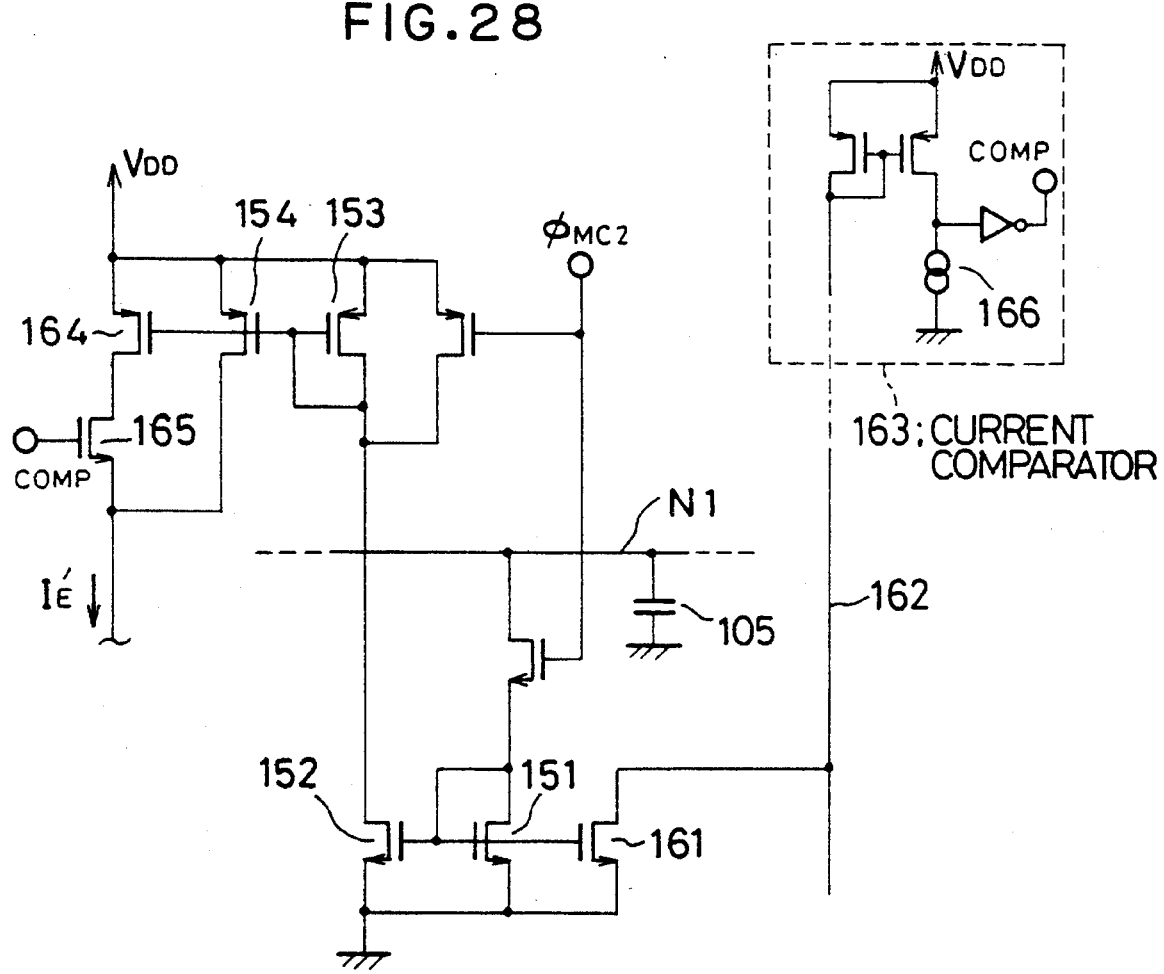
FIG. 28 is a circuit diagram illustrating major parts of a thirteenth embodiment according to the present invention.

This can be accomplished according to a thirteen embodiment, whose specific configuration is shown in FIG. 28. FIG. 28 illustrates only a current mirror 160, because the other portions of the thirteen embodiment are the same as those of the twelfth embodiment shown in FIG. 26. In FIG. 28, reference numeral 161 denotes a transistor whose gate is connected in common to the gates of both transistors 151 and 152, wherein the drain of the transistor 161 is connected to the background monitor signal line 162 which is used in common for all pixels. The background monitor signal line 162 is connected to a current comparator 163. In the current comparator 163, the monitor signal current is reflected back at a current mirror, and then compared with a reference current 166. If the current flowing through the monitor signal line is greater than the reference current, "L" output is provided from the COMP terminal. If the current flowing through the monitor signal line is smaller than the reference current, "H" output is provided. Furthermore, the current mirror in each pixel has an additional transistor 164 whose gate is connected in common to the gates of both transistors 153 and 154, as well as additional switching transistor 165 for switching on or off the current of the transistor 164.

In the current mirror configured according to the thirteen embodiment as described above, when COMP="L", $I_E'$ includes only a component reflected back by the transistor 154, however when COMP="H", $I_E'$ includes an additional current flowing through the transistor 164. Therefore, in the relationship $I_E' = \alpha I_E$, when the background is bright, $\alpha$ becomes small, and when the background is dark, $\alpha$ becomes large. Thus, it is possible to reduce the charging time of the current memory capacitor 107 even in the case where the background is dark. In this way, the charging time of the current memory capacitor 107 can be optimized by changing over the value of $\alpha$ depending on the brightness.

Figure 29:
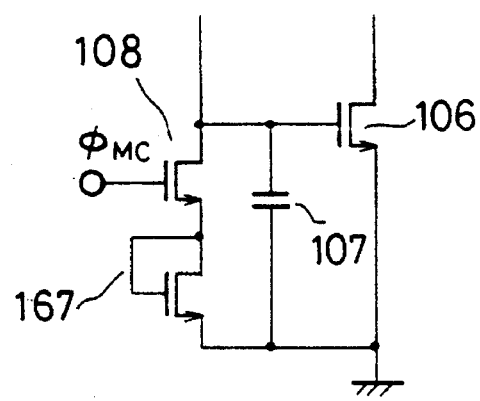
FIG. 29 is a circuit diagram illustrating major parts of a fourteenth embodiment according to the present invention.

Instead of the configuration according to the thirteenth embodiment, the charging time may also be reduced by employing a current memory circuit 113 having a configuration according to a fourteenth embodiment as shown in FIG. 29. The fourteenth embodiment shown in FIG. 29 is the same as the twelfth embodiment shown in FIG. 26 except that an additional transistor 167 is connected in series to the switching transistor 108 wherein the gate and drain of the transistor 167 are directly connected to each other. If the dimensions of the transistor 167 are made the same as those of the current memory transistor 106 (for the case $\alpha=1$), then the current memory capacitor 107 can obtain a correct initial voltage. If $\alpha=1$, and furthermore if the dimensions of the transistors 106 and 167 are approximately the same, then $V_{GS6}$ is maintained at a value corresponding to $I_{PD}/2$. Therefore, when $\phi_{MC1}$ is changed from "H" to "L" it is necessary only to perform charging up corresponding to the feedthrough charges of this switching transistor, and the charges required to increase $V_{GS6}$ so as to obtain twice $I_M$ (wherein the charges are approximately equal to 30 mV× the capacitance of the current memory capacitor 107). Thus, it is possible to reduce the charging time. By modifying only a part of the twelfth embodiment shown in FIG. 26, as described above, the reduction in memorizing time (the time period $T_1$ in FIG. 27) of the current memory circuit can be achieved.

In the embodiment from the sixth and the fourteenth, there are disclosed detection cells which can cancel the background light so that only the reflected light may be detected. A suitable one may be selected from these embodiments depending on required conditions, such as accuracy, dimensions of a photodiode, a required structure such as a one- or two-dimensional array, etc. According to any embodiment, it is possible to achieve a solid-state image pickup device which can perform high accuracy cancellation of background light so that reflected projection light may be detected even for a bright background.

What is claimed is:

1. A solid-state image pickup device comprising a detection cell, said detection cell comprising:

a photodiode;

a storage capacitor for storing a photo-induced charge induced in said photodiode;

a transfer transistor, the source of said transfer transistor being connected to said photodiode, the drain of said transfer transistor being connected to said storage capacitor;

an inverter, the input of said inverter being connected to said photodiode, the output of said inverter being connected to the gate of said transfer transistor; and a current memory circuit, said current memory circuit being connected in parallel to said storage capacitor, said current memory circuit being capable of maintaining a current at a value corresponding to a current flowing out via said transfer transistor.

2. A solid-state image pickup device comprising a detection cell, said detection cell comprising:

a photodiode;

a storage capacitor for storing a photo-induced charge induced in said photodiode;

a transfer transistor, the source of said transfer transistor being connected to said photodiode, the drain of said transfer transistor being connected to said storage capacitor;

an inverter, the input of said inverter being connected to said photodiode, the output of said inverter being connected to the gate of said transfer transistor;

a current memory circuit, said current memory circuit being connected in parallel to said storage capacitor, said current memory circuit being capable of maintaining a current at a value corresponding to a current flowing out via said transfer transistor; and an amplifier for generating an amplified output corresponding to the potential of said storage capacitor.

3. A solid-state image pickup device according to claim 2, wherein said amplifier is configured such that said amplifier outputs the change in potential of said storage capacitor relative to a reference voltage.

4. A solid-state image pickup device according to claim 2, wherein said current memory circuit comprises:
- a current memory transistor, the source of said current memory transistor being grounded, a capacitor is connected in parallel between the source and the gate of said current memory transistor; and
- a switching transistor, said switching transistor being connected between the gate and drain of said current memory transistor, said switching transistor turning on or off under the control of a pulse applied to the gate of said switching transistor.

5. A solid-state image pickup device according to claim 3, wherein said current memory circuit comprises:
- a current memory transistor, the source of said current memory transistor being grounded, a capacitor is connected in parallel between the source and the gate of said current memory transistor; and
- a switching transistor, said switching transistor being connected between the gate and drain of said current memory transistor, said switching transistor turning on or off under the control of a pulse applied to the gate of said switching transistor.

6. A solid-state image pickup device comprising a detection cell, said cell comprising:
- a photodiode;
- a storage capacitor for storing a photo-induced charge induced in said photodiode;
- a selection switch for reading out the signal charges stored in said storage capacitor to an output signal line;
- a charge transfer circuit including an inverter, and a transfer transistor having a source connected to the input of said inverter and a gate connected to the output of said inverter, said charge transfer circuit, connected to said storage capacitor at a node, transferring said photo-induced charge induced in said photodiode to said storage capacitor while maintaining said photodiode at a constant potential; and
- a current memory circuit, connected to said node detecting, as a photo-induced current, the photo-induced charge induced in said photodiode and for storing the detected current value, thereby drawing the photo-induced charge induced in said photodiode.

7. A solid-state image pickup device according to claim 6, wherein said current memory circuit is connected in parallel with said charge storage capacitor.

8. A solid-state image pickup device according to claim 6, further comprising an amplifier connected between said storage capacitor and said selection switch, for producing an amplified output corresponding to the potential of said storage capacitor.

9. A solid-state image pickup device according to claim 8, wherein said amplifier is configured such that said amplifier outputs the change in potential of said storage capacitor relative to a reference voltage.

10. A solid-state image pickup device according to claim 6, wherein said current memory circuit comprises:
- a current memory transistor, the source of said current memory transistor being grounded,
- a capacitor connected in parallel between the source and the gate of said current memory transistor; and
- a switching transistor, said switching transistor being connected between the gate and drain of said current memory transistor, said switching transistor turning on or off under the control of a pulse applied to the gate of said switching transistor.

11. A solid-state image pickup device according to claim 9, wherein said current memory circuit comprises:
- a current memory transistor, the source of said current memory transistor being grounded,
- a capacitor connected in parallel between the source and the gate of said current memory transistor; and
- a switching transistor, said switching transistor being connected between the gate and the drain of said current memory transistor, said switching transistor turning on or off under the control of a pulse applied to the gate of said switching transistor.

* * * * *